United States Patent
Bonnier et al.

(10) Patent No.: US 12,530,757 B2
(45) Date of Patent: Jan. 20, 2026

(54) TECHNIQUES FOR GENERATING GAIN MAPS BASED ON ACQUIRED IMAGES

(71) Applicant: Apple Inc., Cupertino, CA (US)

(72) Inventors: Nicolas P. Bonnier, Mountain View, CA (US); Jackson K. Roland, San Jose, CA (US)

(73) Assignee: Apple Inc., Cupertino, CA (US)

( * ) Notice: Subject to any disclaimer, the term of this patent is extended or adjusted under 35 U.S.C. 154(b) by 191 days.

(21) Appl. No.: 18/501,972

(22) Filed: Nov. 3, 2023

(65) Prior Publication Data

US 2024/0153053 A1   May 9, 2024

Related U.S. Application Data

(60) Provisional application No. 63/383,030, filed on Nov. 9, 2022.

(51) Int. Cl.
*G06T 5/92* (2024.01)

(52) U.S. Cl.
CPC ...... *G06T 5/92* (2024.01); *G06T 2207/20208* (2013.01)

(58) Field of Classification Search
None
See application file for complete search history.

(56) References Cited

U.S. PATENT DOCUMENTS

| 6,804,409 | B2 | 10/2004 | Sobol et al. |
| 9,058,639 | B2 | 6/2015 | Salvucci |
| 10,402,952 | B2 * | 9/2019 | Baar ............... G06T 5/50 |
| 11,257,195 | B2 * | 2/2022 | Andrivon ........ H04N 19/30 |

(Continued)

FOREIGN PATENT DOCUMENTS

| CN | 115311154 A | 11/2022 |
| EP | 2579591 A1 | 4/2013 |
| EP | 3205093 B1 | 5/2022 |

OTHER PUBLICATIONS

Chul Lee et al: Rate-distortion optimized layered coding of high dynamic range videos, Journal of Visual Communication and Image Representation, Academic Press, Inc, US, vol. 23, No. 6, May 30, 2012, pp. 908-923, XP028424859, ISSN: 1047-3203, DOI: 10.1016/J.JVCIR.2012.05.009 [retrieved on Jun. 12, 2012] Abstract, section 3.

(Continued)

*Primary Examiner* — David Ometz
(74) *Attorney, Agent, or Firm* — DICKINSON WRIGHT RLLP

(57) ABSTRACT

Disclosed are various techniques for generating gain maps. According to some embodiments, one technique for generating a gain map includes the steps of (1) accessing a high dynamic range (HDR) image, (2) accessing a standard dynamic range (SDR) image, (3) for each pixel shared between the HDR and SDR images: plotting the pixel onto a graph, wherein an HDR value of the pixel is plotted on a Y-axis of the graph and an SDR value of the pixel is plotted on an X-axis of the graph, (4) establishing a first curve that represents an approximation of the plotted pixels, (5) inverting the first curve to establish a second curve, (6) applying the second curve against the plotted pixels to establish replotted pixels, (7) generating the gain map based on the replotted pixels, and (8) embedding the gain map into the HDR image.

20 Claims, 19 Drawing Sheets

(56) References Cited

U.S. PATENT DOCUMENTS

| | | | |
|---|---|---|---|
| 2013/0083838 A1 | 4/2013 | Touze et al. | |
| 2018/0182081 A1 | 6/2018 | Chesnokov | |
| 2018/0232867 A1* | 8/2018 | Park | G06T 5/92 |
| 2022/0092749 A1 | 3/2022 | Johnson et al. | |
| 2022/0358627 A1* | 11/2022 | Deng | G06N 3/08 |
| 2024/0223910 A1 | 7/2024 | Chan et al. | |
| 2025/0124555 A1 | 4/2025 | Ho et al. | |
| 2025/0285248 A1 | 9/2025 | Deakin et al. | |

OTHER PUBLICATIONS

"High-Performance Single Layer High Dynamic Range (HDR) System for use in Consumer Electronics devices; Part 2: Enhancements for Perceptual Quantization (PQ) transfer function based High Dynamic Range (HDR) Systems (SL-HDR2)", ETSI, vol. BROADCAS, No. VI.3.1, Aug. 23, 2021, pp. 1-84, Retrieved from the Internet: URL:http://www.etsi.org/deliver/etsi_ts/103400_103499/10343302/01.03.01_60/ts_103433 02v010301p.pdf [retrieved on Aug. 23, 2021], pp. 14-15, section 5, pp. 47-48, Annex I.

Is&t Electronic Imaging (ei) Symposium: "EI 2023 Plenary: Embedded Gain Maps for Adaptive Display of High Dynamic Range Images", Jan. 17, 2023, XP093086658, Retrieved from the Internet: URL:https://www.youtube.com/watch v=HBVBLV 9KZNI ab_channel=IS TElectronicimaging(EI) Symposium [retrieved on Sep. 27, 2023].

Li et al: "An adaptive algorithm for the display of high-dynamic range images", Journal of Visual Communication and Image Representation, Academic Press, Inc, US, vol. 18, No. 5, Sep. 5, 2007, pp. 397-405, XP022231046, ISSN: 1047-3203, DOI: 10.1016/J.JVCIR.2007.06.005.

PCT Patent Application No. PCT/US2023/036877—International Search Report and Written Opinion dated Feb. 6, 2024.

Eric Chan, "Gain Maps", Feb. 28, 2024 (Feb. 28, 2024), XP093143161, Retrieved from the Internet: URL:https://helpx.adobe.com/content/dam/help/en/camera-raw/using/gain-map/jcr_content/root/content/flex/items/position/position-par/table/row-3u03dx0-column-4a63daf/download section/download-1/Gain_Map_ 1_Od15.pdf [retrieved on Mar. 19, 2024], 15 pages.

PCT Patent Application No. PCT/US2023/036874—International Search Report and Written Opinion dated Apr. 8, 2024.

PCT Patent Application No. PCT/US2023/036866—International Search Report and Written Opinion dated Apr. 30, 2024.

Touil et al., "Inverse tone mapping high dynamic range images", 2017 International Conference on Advanced Systems and Electric Technologies (IC_ASET), IEEE, Jan. 14, 2017, pp. 129-133, XP033124562, Section III, Figure 3.

U.S. Appl. No. 18/501,976, Non-Final Office Action dated Dec. 5, 2025.

* cited by examiner

Step 210 – Access A Multi-Channel High Dynamic Range (HDR) Image

Step 220 – Access A Multi-Channel Standard Dynamic Range (SDR) Image

Step 320 – Establish An Approximation Curve For The Plotted Pixels And Store It As A Global Tone Map With The HDR Image

Step 410 – Access A First Version Of A Multi-Channel Image

Step 420 – Detect At Least One Modification To The First Version Of The Multi-Channel Image That Produces A Second Version Of The Multi-Channel Image

Step 440 – Embed The Multi-Channel Gain Map Into The First Version Of The Multi-Channel Image

TECHNIQUES FOR GENERATING GAIN MAPS BASED ON ACQUIRED IMAGES

CROSS-REFERENCE TO RELATED APPLICATIONS

The present application claims the benefit of U.S. Provisional Application No. 63/383,030, entitled "TECHNIQUES FOR GENERATING GAIN MAPS BASED ON ACQUIRED IMAGES," filed Nov. 9, 2022, the content of which is incorporated by reference herein in its entirety for all purposes.

FIELD OF INVENTION

The embodiments described herein set forth techniques for generating gain maps based on acquired images. In particular, a gain map can be generated by comparing a first image to a second image. The gain map can then be embedded into the first image to enable the second image to be efficiently reproduced using the first image and the gain map.

BACKGROUND

The dynamic range of an image refers to the range of pixel values between the image's lightest and darkest parts (often referred to as "luminance"). Notably, conventional image sensors can only capture a limited range of luminance in a single exposure of a scene, at least relative to what human eyes are able to perceive from the same scene. This limited range is typically referred to as standard dynamic range (SDR) in the world of digital photography.

Despite the foregoing image sensor limitations, improvements in photography techniques have enabled wider ranges of light to be captured (referred to herein as high dynamic range (HDR)). This can be achieved by (1) capturing multiple "brackets" of images, i.e., images with different exposure times (also called "stops"), and then (2) fusing the bracketed images into a single image that incorporates different aspects of the different exposures. In this regard, the single HDR image possesses a wider dynamic range of luminance in comparison to what otherwise can be captured in each of the individual exposures. This makes HDR images superior to SDR images in several aspects.

Display devices capable of displaying HDR images (in their true form) are becoming more accessible due to advancements in design and manufacturing technologies. However, a majority of display devices that are currently in use (and continue to be manufactured) are only capable of displaying SDR images. Consequently, devices with SDR-limited displays that receive HDR images must perform various tasks to convert (i.e., downgrade) the HDR image to an SDR image equivalent. Conversely, devices with HDR-capable displays that receive SDR images may attempt to perform various tasks to convert (i.e., upgrade) the SDR image to an HDR image equivalent.

Unfortunately, the foregoing conversion techniques typically produce inconsistent and/or undesirable results. In particular, downgrading an HDR image to an SDR image can introduce visual artifacts (e.g., banding) into the resulting image that often are uncorrectable through additional image processing. Conversely, upgrading an SDR image to an HDR image involves applying varying levels of guesswork, which also can introduce uncorrectable visual artifacts.

Accordingly, what is needed is a technique for enabling images to be efficiently and accurately transitioned between different states. For example, it is desirable to enable an HDR image to be downgraded to its true SDR counterpart (and vice versa) without relying on the foregoing (and deficient) conversion techniques.

SUMMARY OF INVENTION

Representative embodiments set forth herein disclose techniques for generating gain maps based on acquired images. In particular, a gain map can be generated by comparing a first image to a second image. The gain map can then be embedded into the first image to enable the second image to be efficiently reproduced using the first image and the gain map.

Another embodiment sets forth an alternative method for generating a gain map based on an HDR image and an SDR image. In particular, the method includes the steps of (1) accessing the HDR image, (2) accessing the SDR image, (3) for each pixel shared between the HDR and SDR images: plotting the pixel onto a graph, where an HDR value of the pixel is plotted on a Y-axis of the graph and an SDR value of the pixel is plotted on an X-axis of the graph, (4) establishing a first curve that represents an approximation of the plotted pixels, (5) inverting the first curve to establish a second curve, (6) applying the second curve against the plotted pixels to establish replotted pixels, (7) generating the gain map based on the replotted pixels, and (8) embedding the gain map into the HDR image.

Yet another embodiment sets forth an alternative method for generating a gain map based on a first version of an image and a second version of the image. In particular, the method includes the steps of (1) accessing the first version of the image, (2) detecting at least one modification to the first version of the image that produces the second version of the image, (3) generating the gain map by comparing the first version of the image to the second version of the image, and (4) embedding the gain map into the first version of the image.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments can be practiced without some or all of these specific details. In other instances, well-known process steps have not been described in detail in order to avoid unnecessarily obscuring the described embodiments. Other applications are possible, such that the following examples should not be taken as limiting.

In the following detailed description, references are made to the accompanying drawings, which form a part of the description, and in which are shown, by way of illustration, specific embodiments in accordance with the described embodiments. Although these embodiments are described in sufficient detail to enable one skilled in the art to practice the described embodiments, it is understood that these examples are not limiting such that other embodiments can be used, and changes can be made without departing from the spirit and scope of the described embodiments.

Representative embodiments set forth herein disclose techniques for generating gain maps based on acquired images. In particular, a gain map can be generated by comparing a first image to a second image. The gain map can then be embedded into the first image to enable the second image to be efficiently reproduced using the first image and the gain map. A more detailed description of these techniques is provided below in conjunction with FIGS. 1, 2A-2E, 3A-3G, 4A-4E, and 5.

Figure 1:
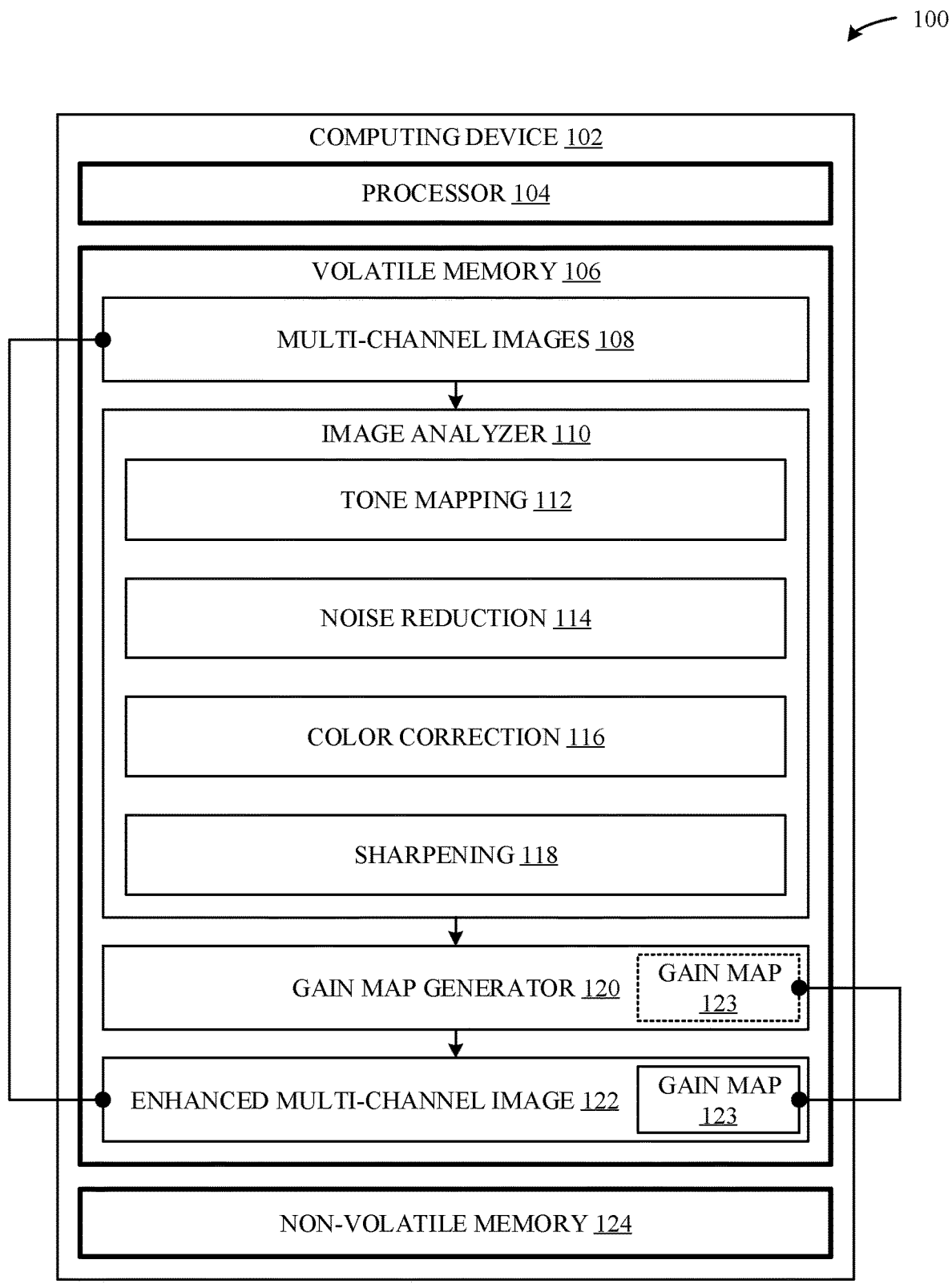
FIG. 1 illustrates an overview of a computing device that can be configured to perform the various techniques described herein, according to some embodiments.
Figure 5:
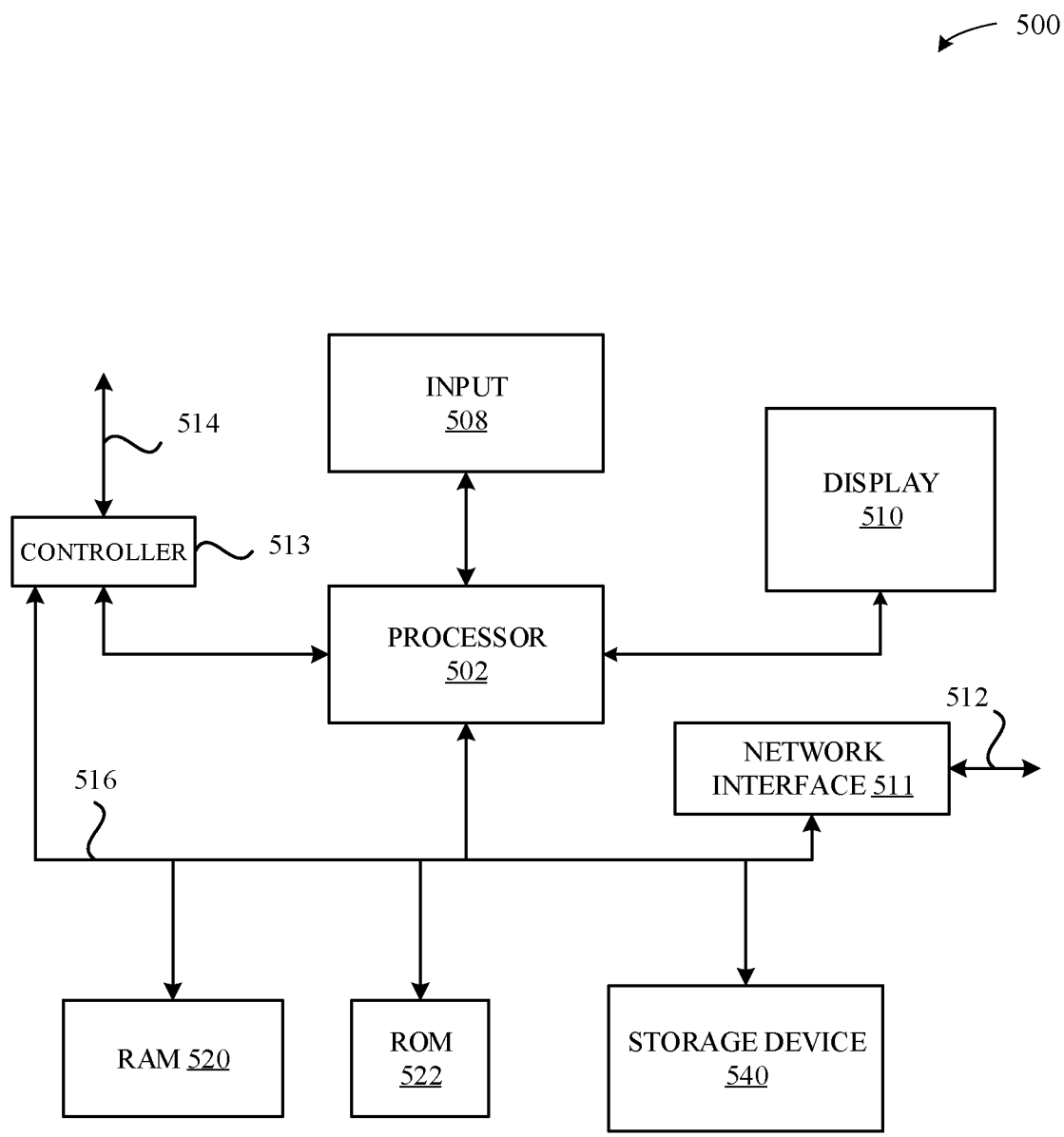
FIG. 5 illustrates a detailed view of a computing device that can be used to implement the various techniques described herein, according to some embodiments.

FIG. 1 illustrates an overview 100 of a computing device 102 that can be configured to perform the various techniques described herein. As shown in FIG. 1, the computing device 102 can include a processor 104, a volatile memory 106, and a non-volatile memory 124. It is noted that a more detailed breakdown of example hardware components that can be included in the computing device 102 is illustrated in FIG. 5, and that these components are omitted from the illustration of FIG. 1 merely for simplification purposes. For example, the computing device 102 can include additional non-volatile memories (e.g., solid-state drives, hard drives, etc.), other processors (e.g., a multi-core central processing unit (CPU)), a graphics processing unit (GPU), and so on). According to some embodiments, an operating system (OS) (not illustrated in FIG. 1) can be loaded into the volatile memory 106, where the OS can execute a variety of applications that collectively enable the various techniques described herein to be implemented. For example, these applications can include an image analyzer 110 (and its internal components), a gain map generator 120 (and its internal components), one or more compressors (not illustrated in FIG. 1), and so on.

As shown in FIG. 1, the volatile memory 106 can be configured to receive multiple-channel images 108. The multiple-channel images 108 can be provided, for example, by a digital imaging unit (not illustrated in FIG. 1) that is configured to capture and process digital images. According to some embodiments, a multiple-channel image 108 can be composed of a collection of pixels, where each pixel in the collection of pixels includes a group of sub-pixels (e.g., a red sub-pixel, a green sub-pixel, a blue sub-pixel, etc.). It is noted that the term "sub-pixel" used herein can be synonymous with the term "channel." It is also noted that the multiple-channel images 108 can have different resolutions, layouts, bit-depths, and so on, without departing from the scope of this disclosure.

According to some embodiments, a given multiple-channel image 108 can represent a standard dynamic range (SDR) image that constitutes a single exposure of a scene that is gathered and processed by the digital imaging unit. A given multiple-channel image 108 can also represent a high dynamic range (HDR) image that constitutes multiple exposures of a scene that are gathered and processed by the digital imaging unit. To generate an HDR image, the digital imaging unit may capture a scene under different exposure brackets, e.g., three exposure brackets that are often referred to as "EV0", "EV−", and "EV+". Generally, the EV0 image corresponds to a normal/ideal exposure for the scene (typically captured using auto-exposure settings of the digital imaging unit); the EV− image corresponds to an under-exposed image of the scene (e.g., four times darker than EV0), and the EV+ image corresponds to an over-exposed image of the scene (e.g., four times brighter than EV0). The digital imaging unit can combine the different exposures to produce a resultant image that incorporates a greater range of luminance relative to SDR images. It is noted that the multiple-channel images 108 discussed herein are not limited to SDR/HDR images. On the contrary, the multiple-channel images 108 can represent any form of digital image (e.g., scanned images, computer-generated images, etc.) without departing from the scope of this disclosure.

As shown in FIG. 1, the multiple-channel images 108 can (optionally) be provided to the image analyzer 110. According to some embodiments, the image analyzer 110 can include various components that are configured to process/modify the multiple-channel images 108 as desired. For example, the image analyzer 110 can include a tone mapping unit 112 (e.g., configured to perform global/local tone mapping operations, inverse tone mapping operations, etc.), a noise reduction unit 114 (e.g., configured to reduce global/local noise in the multiple-channel image), a color correction unit 116 (e.g., configured to perform global/local color corrections in the multiple-channel image), and a sharpening unit 118 (e.g., configured to perform global/local sharpening corrections in the multiple-channel image). It is noted that image analyzer 110 is not limited to the aforementioned processing units, and that the image analyzer 110 can incorporate any number of processing units, configured to perform any processing of/modifications to the multiple-channel images 108, without departing from the scope of this disclosure.

As shown in FIG. 1, the multiple-channel images 108 can be provided to the gain map generator 120 after being processed by the image analyzer 110. However, it is noted that the multiple-channel images 108 can bypass the image analyzer 110 and be provided to the gain map generator 120, if so desired, without departing from the scope of this disclosure. It is also noted that the multiple-channel images 108 can bypass one or more of the processing units of the image analyzer 110 without departing from the scope of this disclosure. For example, two given multiple-channel images may be passed through the tone mapping unit 112 to receive local tone mapping modifications, and then bypass the remaining process units in the image analyzer 110. In this regard, the two multiple-channel images—which have undergone local tone mapping operations—can be utilized to generate a gain map 123 that reflects the local tone mapping operations that were performed. In any case—and, as described in greater detail herein—the gain map generator 120 can, upon receiving two multiple-channel images 108, generate a gain map 123 based on the two multiple-channel images 108. In turn, the gain map generator 120 can store the gain map 123 into one of the two multiple-channel images 108 to produce an enhanced multiple-channel image 122. It is additionally noted that the gain map generation techniques can be performed at any time relative to the receipt of the multiple-channel images on which the gain map will be based. For example, the gain map generator 120 can be configured to defer the generation of a gain map when the digital imaging unit is in active use in order to ensure adequate processing resources are available so that slow-downs will not be imposed on users. A more detailed breakdown of the manners in which the gain map generator 120 can generate gain maps 123 is provided below in conjunction with FIGS. 2A-2E, 3A-3G, and 4A-4E.

Additionally, and although not illustrated in FIG. 1, one or more compressors can be implemented on the computing device 102, for compressing the enhanced multiple-channel images 122. For example, the compressors can implement Lempel-Ziv-Welch (LZW)-based compressors, other types of compressors, combinations of compressors, and so on. Moreover, the compressor(s) can be implemented in any manner to establish an environment that is most efficient for compressing the enhanced multiple-channel images 122. For example, multiple buffers can be instantiated (where pixels can be pre-processed in parallel), and each buffer can be tied to a respective compressor such that the buffers can be simultaneously compressed in parallel as well. Moreover, the same or a different type of compressor can be tied to each of the buffers based on the formatting of the enhanced multiple-channel images 122.

Accordingly, FIG. 1 provides a high-level overview of different hardware/software architectures that can be implemented by computing device 102 in order to carry out the various techniques described herein. A more detailed breakdown of these techniques will now be provided below in conjunction with FIGS. 2A-2E, 3A-3G, and 4A-4E.

Figure 2A:
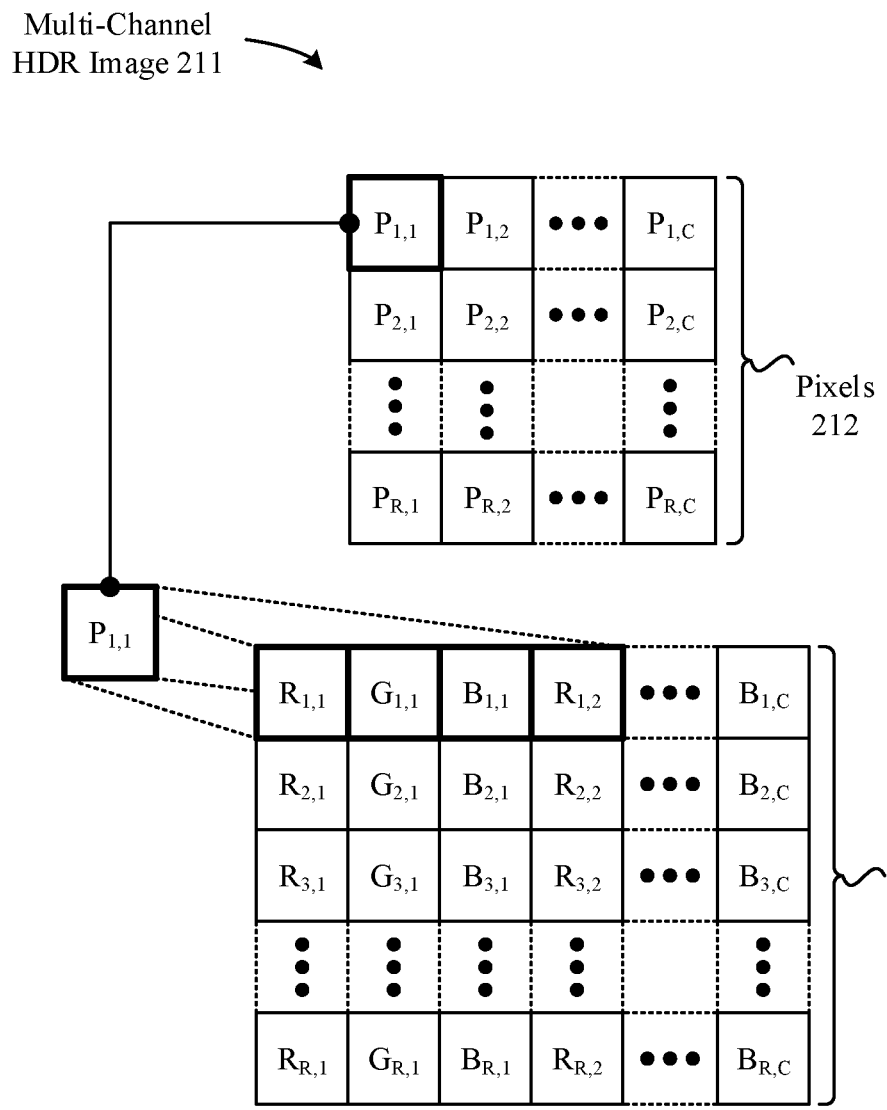
FIGS. 2A-2E illustrate a sequence of conceptual diagrams of a technique for generating a gain map based on an SDR image and an HDR image, according to some embodiments.

FIGS. 2A-2E illustrate a sequence of conceptual diagrams of a technique for generating a gain map based on an SDR image and an HDR image, according to some embodiments. As shown in FIG. 2A, a step 210 can involve the computing device 102 accessing a multiple-channel HDR image 211, which is composed of pixels 212 (each denoted as "P"). As shown in FIG. 2A, the pixels 212 can be arranged according to a row/column layout, where the subscript of each pixel 212 "P" (e.g., "1,1") indicates the location of the pixel 212 in accordance with the rows and columns. In the example illustrated in FIG. 2A, the pixels 214 of the multiple-channel image 108 are arranged in an equal number of rows and columns, such that the multiple-channel image 108 is a square image. However, it is noted that the techniques described herein can be applied to multiple-channel images 108 having different layouts (e.g., disproportionate row/column counts). In any case, and as additionally shown in FIG. 2A, each pixel 212 can be composed of three sub-pixels 214—a red sub-pixel 214 (denoted "R"), a green sub-pixel 214 (denoted "G"), and a blue sub-pixel 214 (denoted "B"). It is noted, however, that each pixel 212 can be composed of any number of sub-pixels without departing from the scope of this disclosure.

Figure 2B:
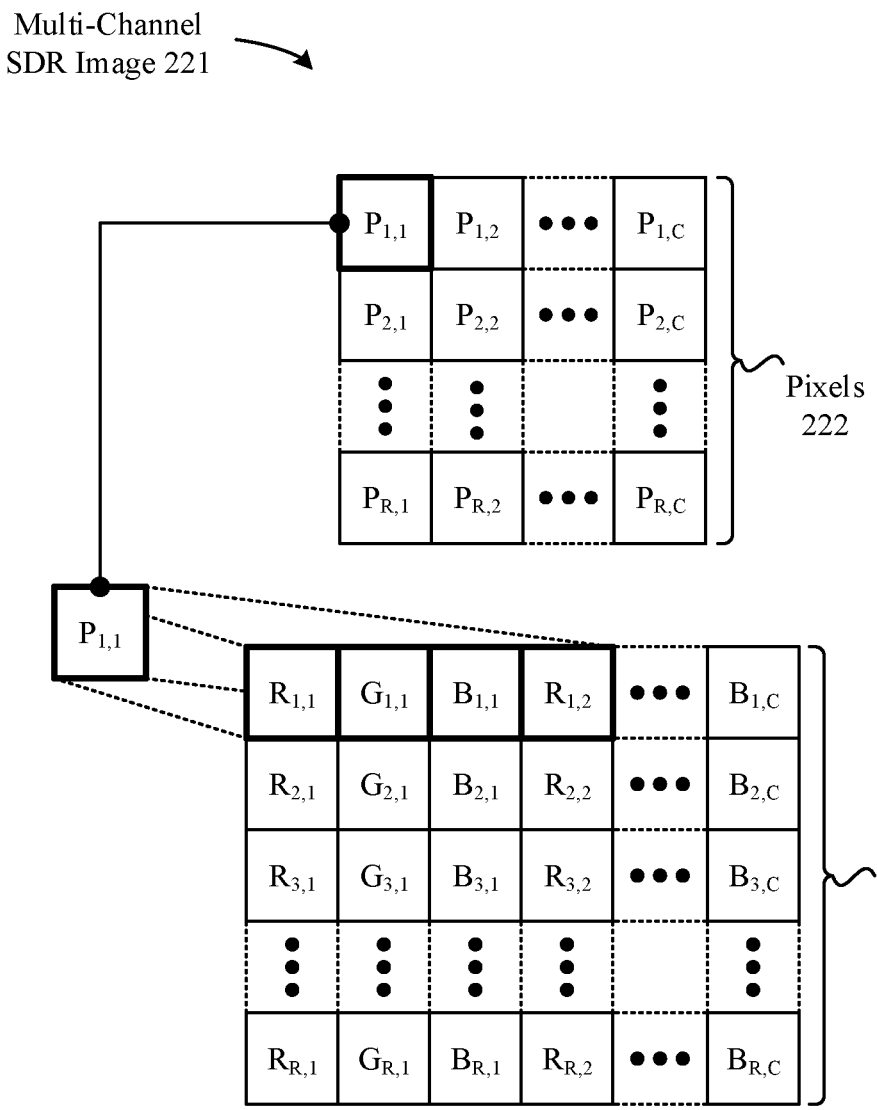

FIG. 2B illustrates a step 220 that involves the computing device 102 accessing a multiple-channel SDR image 221. As shown in FIG. 2B, the multiple-channel SDR image 221 is composed of pixels 222 (and sub-pixels 224) similar to the pixels 212 (and sub-pixels 214) of the multiple-channel HDR image 211 illustrated in FIG. 2A. According to some embodiments, the multiple-channel SDR image 221 is a single-exposure capture of the same scene captured by the multiple-channel HDR image 211, such that the multiple-channel SDR image 221 and the multiple-channel HDR image 211 are substantially related to one another. For example, if the multiple-channel HDR image 211 was generated using the EV−, EV0, and EV+ approach described herein, then the multiple-channel SDR image 221 can be based on the EV0 exposure (e.g., prior to the EV0 exposure being merged with the EV− and the EV+ exposures to generate the multiple-channel HDR image 211). This approach can ensure that both the multiple-channel HDR image 211 and the multiple-channel SDR image 221 correspond to the same scene at the same moment of time. In this manner, the pixels of the multiple-channel HDR image 211 and the multiple-channel SDR image 221 may differ only in luminosities gathered from the same points of the same scene (as opposed to differing in scene content due to movements stemming from the passage of time that would occur through sequentially captured exposures).

Figure 2C:
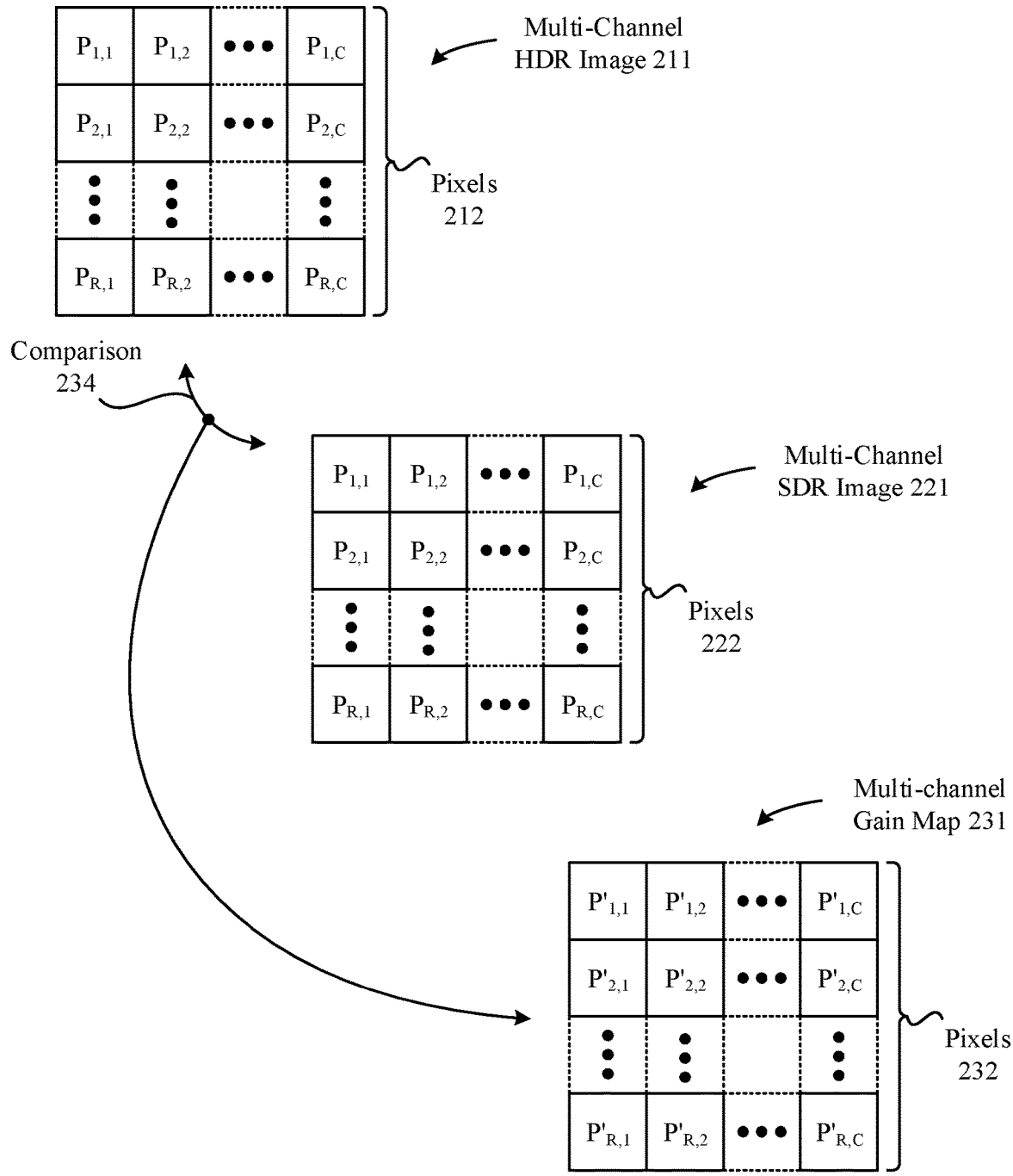

FIG. 2C illustrates a step 230 that involves the computing device 102 generating a multiple-channel gain map 231 (composed of pixels 232) by comparing the multiple-channel HDR image 211 and the multiple-channel SDR image 221 (illustrated in FIG. 2C as the comparison 234). Here, a first approach can be utilized if it is desirable to enable the multiple-channel SDR image 221 to be reproduced using the multiple-channel HDR image 211. In particular, the first approach involves dividing the value of each pixel of the multiple-channel SDR image 221 by the value of the corresponding pixel of the multiple-channel HDR image 211 to produce a quotient. In turn, the respective quotients can be assigned to the values of the corresponding pixels 232 in the multiple-channel gain map 231. For example, if the pixel denoted "$P_{1,1}$" of the multiple-channel HDR image 211 has a value of "5", and the pixel denoted "$P_{1,1}$" of the multiple-channel SDR image 221 has a value of "1", then the quotient would be "0.2", and would be assigned to the value of the pixel denoted "$P_{1,1}$" of multiple-channel gain map 231. In this manner—and, as described in greater detail herein—the pixel denoted "$P_{1,1}$" of the multiple-channel SDR image 221 could be reproduced by multiplying the pixel denoted "$P_{1,1}$" of the multiple-channel HDR image 211 (having a value of "5") by the pixel denoted "$P_{1,1}$" of multiple-channel gain map 231 (having a value of "0.2"). In particular, the multiplication would generate a product of "1", which matches the value "1" of the pixel denoted "$P_{1,1}$" of the multiple-channel SDR image 221. Accordingly, storing the multiple-channel gain map 231 with the multiple-channel HDR image 211 can enable the multiple-channel SDR image 221 to be reproduced independent from the multiple-channel SDR image 221 itself. A more detailed description of the various manners in which the multiple-channel gain map 231 can be stored with counterpart multiple-channel images is described below in conjunction with FIG. 2D.

Alternatively, a second (different) approach can be utilized if it is instead desirable to enable the multiple-channel HDR image 211 to be reproduced using the multiple-channel SDR image 221. In particular, the second approach involves dividing the value of each pixel of the multiple-channel HDR image 211 by the value of the corresponding pixel of the multiple-channel SDR image 221 to produce a quotient. In turn, the respective quotients can be assigned to the values of the corresponding pixels 232 in the multiple-channel gain map 231. For example, if the pixel denoted "$P_{1,1}$" of the multiple-channel SDR image 221 has a value of "3", and the pixel denoted "$P_{1,1}$" of the multiple-channel HDR image 211 has a value of "6", then the quotient would be "2", and would be assigned to the value of the pixel denoted "$P_{1,1}$" of multiple-channel gain map 231. In this manner—and, as described in greater detail herein—the pixel denoted "$P_{1,1}$" of the multiple-channel HDR image 211 could be reproduced by multiplying the pixel denoted "$P_{1,1}$" of the multiple-channel SDR image 221 (having a value of "3") by the pixel denoted "$P_{1,1}$" of multiple-channel gain map 231 (having a value of "2"). In particular, the multiplication would generate a product of "6", which matches the value "6" of the pixel denoted "$P_{1,1}$" of the multiple-channel SDR image 221. Accordingly, storing the multiple-channel gain map 231 with the multiple-channel SDR image 221 can enable the multiple-channel HDR image 211 to be reproduced independent from the multiple-channel HDR image 211 itself. Again, a more detailed description of the various manners in which the multiple-channel gain map 231 can be stored with counterpart multiple-channel images is described below in conjunction with FIG. 2D.

As a brief aside, it is noted that although the comparisons illustrated in FIG. 2C (and described herein) constitute pixel-level comparisons, the embodiments are not so limited. On the contrary, the pixels of the images can be compared to one another, at any level of granularity, without departing from the scope of this disclosure. For example, the sub-pixels of the multiple-channel HDR image 211 and the multiple-channel SDR image 221 can be compared to one another (instead of or in addition to pixel-level comparisons) such that multiple gain maps are generated under different comparison approaches (e.g., a respective gain map for each channel of color).

Additionally, it is noted that various optimizations can be employed when generating the gain maps, without departing from the scope of this disclosure. For example, when two values are identical to one another, the comparison operation can be skipped, and a single bit value (e.g., "0") can be assigned to the corresponding value in the gain map to minimize the size of (i.e., storage requirements for) the gain map. Additionally, the resolution of a gain map can smaller than the resolution of the images that are compared to generate the gain map. For example, an approximation of every four pixels in a first image can be compared against an approximation of every four corresponding pixels in a second image in order to generate a gain map that is one quarter of the resolution of the first and second images. This approach would substantially reduce the size of the gain map but would lower the overall accuracy by which the first image can be reproduced from the second image and the gain map (or vice versa). Additionally, first and second images can be resampled in any conceivable fashion prior to generating a gain map. For example, the first and second images could undergo local tone mapping operations prior to generating a gain map.

Figure 2D:
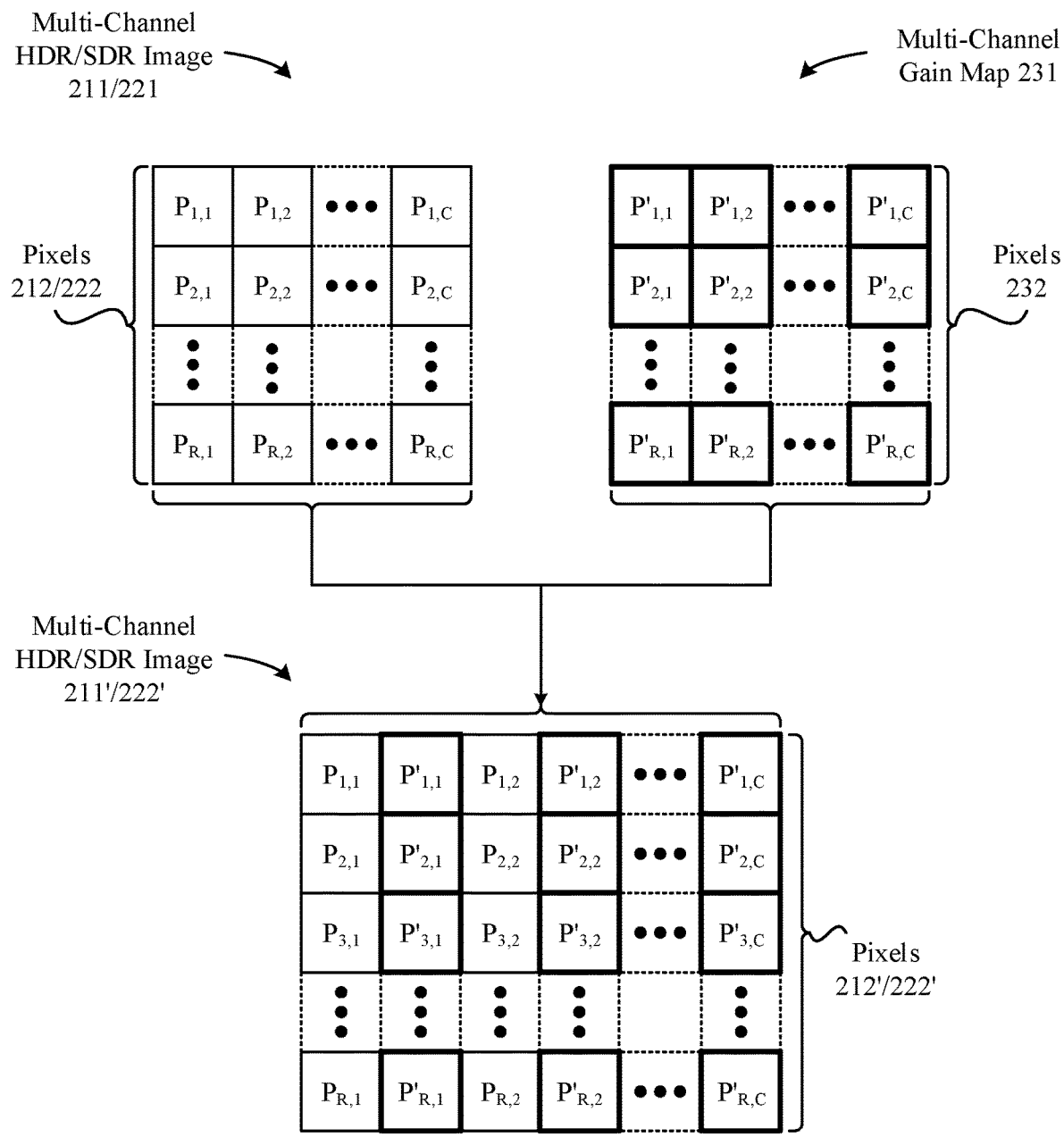

FIG. 2D illustrates a step 240 that involves the computing device 102 embedding the multiple-channel gain map 231 into the multiple-channel HDR image 211 or the multiple-channel SDR image 221, according to some embodiments.

In particular, if the first approach discussed above in conjunction with FIG. 2C is utilized—which enables the multiple-channel SDR image 221 to be reproduced using the multiple-channel HDR image 211 and the multiple-channel gain map 231—then the computing device 102 embeds the multiple-channel gain map 231 into the multiple-channel HDR image 211 (thereby yielding an enhanced multiple-channel image 122). As shown in FIG. 2D, one approach for embedding the multiple-channel gain map 231 into the multiple-channel HDR image 211 involves interleaving each pixel 232 (of the multiple-channel gain map 231) against its corresponding pixel 212 (of the multiple-channel HDR image 211). An alternative approach can involve embedding each pixel 232 (of the multiple-channel gain map 231) into its corresponding pixel 212 (of the multiple-channel gain map 231) as an additional channel of the pixel 212. Yet another approach can involve embedding the multiple-channel gain map 231 as metadata that is stored with the multiple-channel HDR image 211. It is noted that the foregoing approaches are exemplary and not meant to be limiting, and that the multiple-channel gain map 231 (as well as other supplemental gain maps, if generated) can be stored with the multiple-channel HDR image 211, using any conceivable approach, without departing from the scope of this disclosure.

Figure 2E:
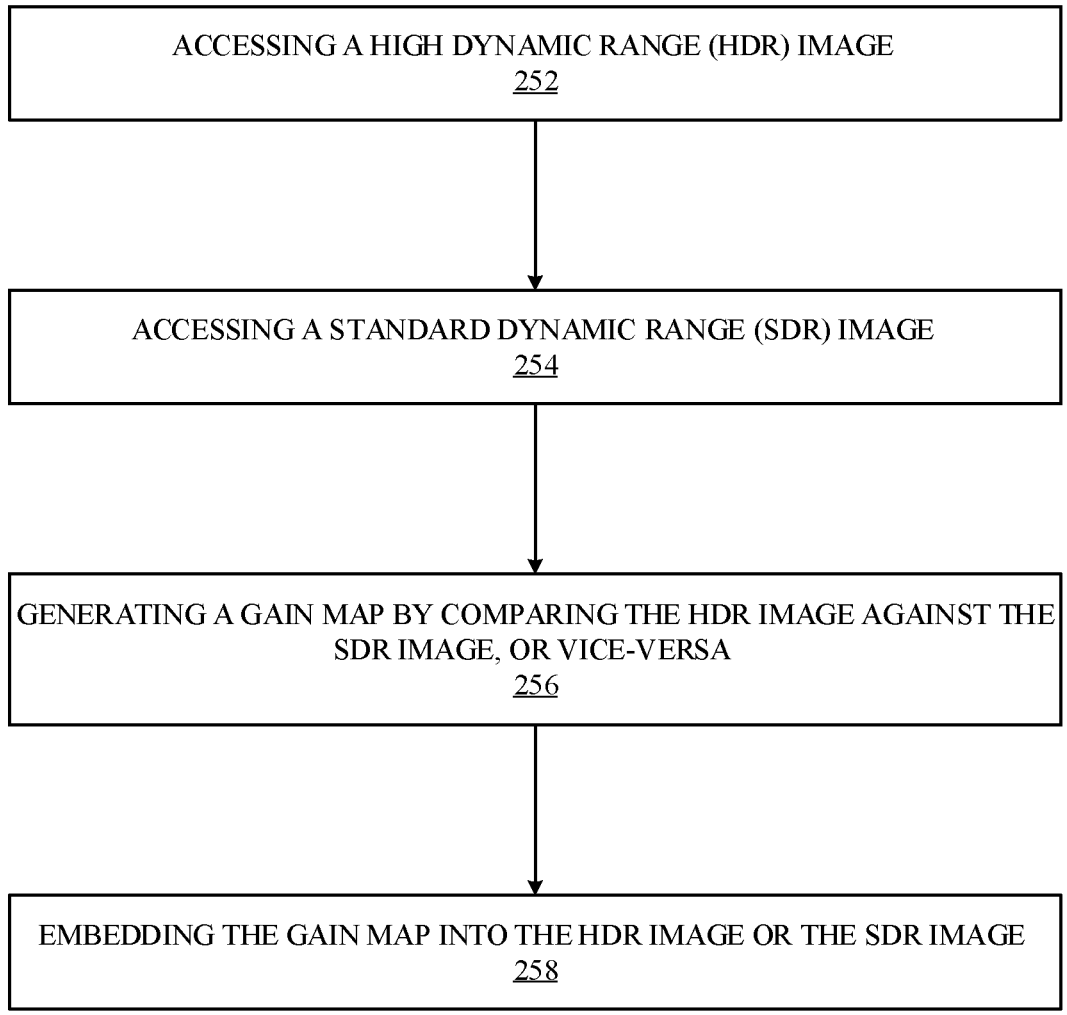

FIG. 2E illustrates a method 250 for generating a gain map based on an SDR image and an HDR image, according to some embodiments. As shown in FIG. 2E, the method 250 begins at step 252, where the computing device 102 accesses an HDR image (e.g., as described above in conjunction with FIG. 2A). At step 254, computing device 102 accesses an SDR image (e.g., as described above in conjunction with FIG. 2B). At step 256, computing device 102 generates a gain map by comparing the HDR image against the SDR image, or vice-versa (e.g., as described above in conjunction with FIG. 2C). At step 258, computing device 102 embeds the gain map into the HDR image or the SDR image (e.g., as described above in conjunction with FIG. 2D, thereby yielding an enhanced multiple-channel image 122).

Figure 3A:
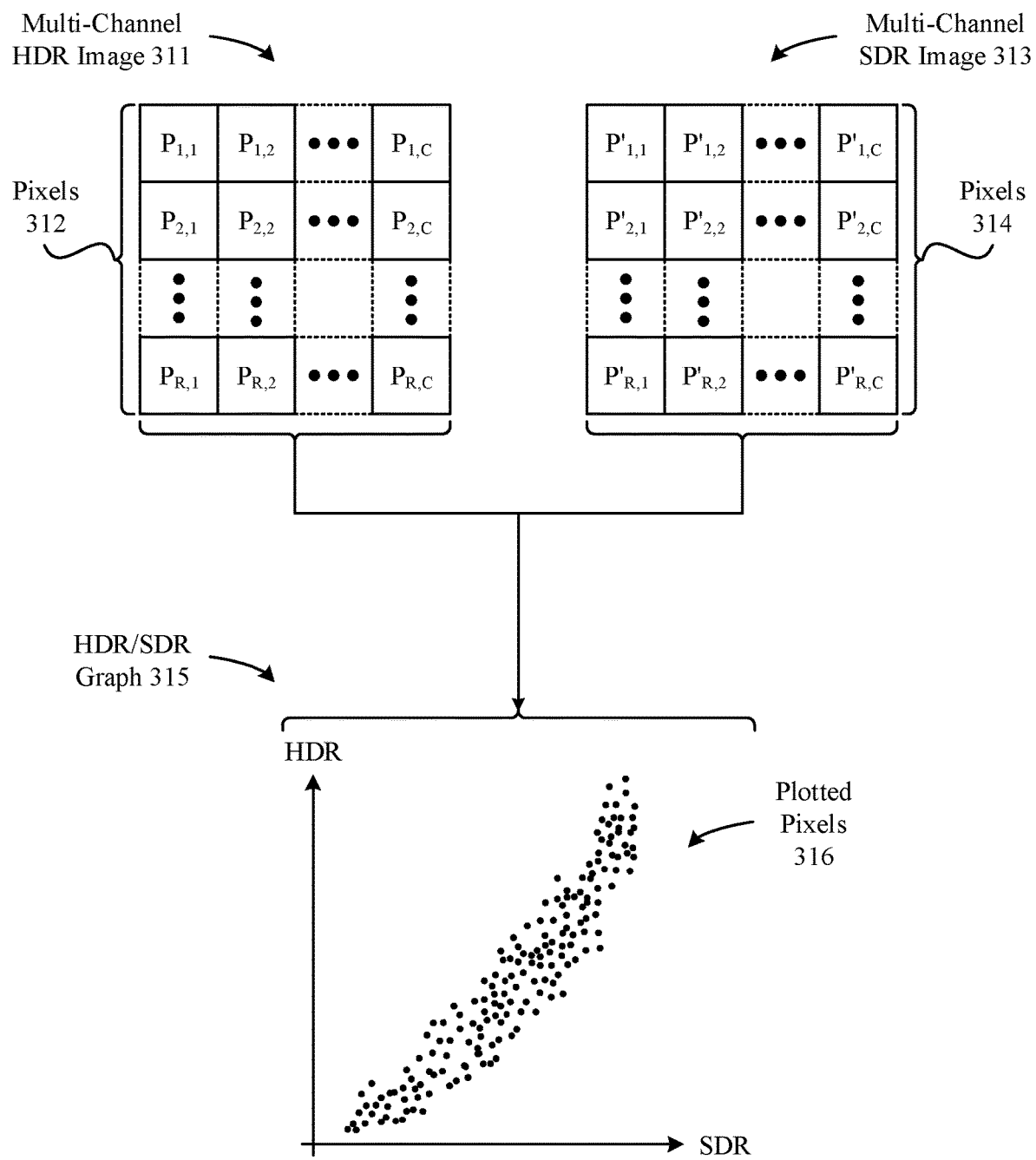
FIGS. 3A-3G illustrate a sequence of conceptual diagrams for an alternative technique for generating a gain map based on an SDR image and an HDR image, according to some embodiments.

FIGS. 3A-3G illustrate a sequence of conceptual diagrams for an alternative technique for generating a gain map based on an SDR image and an HDR image, according to some embodiments. As shown in FIG. 3A, a step 310 can involve the computing device 102 accessing a multiple-channel HDR image 311 and a multiple-channel SDR image 313 (e.g., in manners similar to those described above in conjunction with FIGS. 2A-2B). In turn, the computing device 102 plots shared pixels (i.e., pixels 312/314) of the multiple-channel HDR image 311 and the multiple-channel SDR image 313 onto an HDR/SDR graph 315 as plotted pixels 316. As shown in FIG. 3A, the y-axis of the HDR/SDR graph 315 corresponds to HDR pixel values, whereas the x-axis of the HDR/SDR graph 315 corresponds to SDR pixel values. In this regard, the y-value for a given plotted pixel 316 is assigned based on the corresponding pixel 312 in the multiple-channel HDR image 311, whereas the x-value for the plotted pixel 316 is assigned based on the corresponding pixel 314 in the multiple-channel SDR image 313. It is noted that other approaches can be utilized to plot the pixels without departing from the scope of this disclosure, such as assigning HDR values to the x-axis and SDR values to the y-axis, basing the axes on different values (e.g., channels) of the pixels, and so on.

Figure 3B:
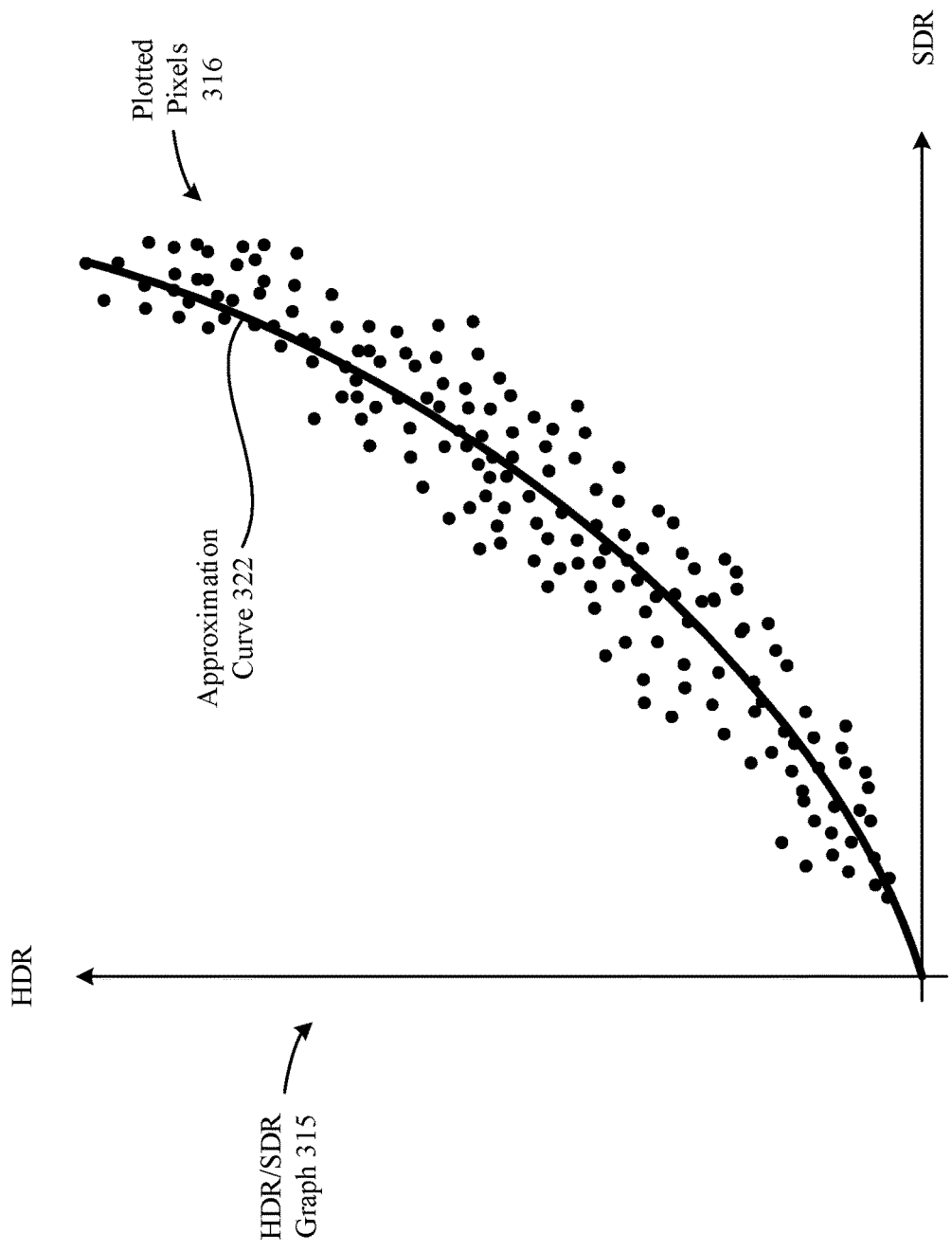

FIG. 3B illustrates a step 320 that involves establishing an approximation curve 322 for the plotted pixels 316. According to some embodiments, the approximation curve 322 can be established using any approach for generating curves based on plotted points of a graph. For example, the approximation curve can represent a moving average of the values of the plotted pixels 316. Regardless of how the approximation curve 322 is generated, the approximation curve 322 can be utilized as a global tone map for downgrading the multiple-channel HDR image 311 to an SDR image equivalent. However, because the approximation curve 322 constitutes an average of the differences between the multiple-channel HDR image 311 and the multiple-channel SDR image 313, the SDR image equivalent (generated by applying the global tone map against the multiple-channel HDR image 311) will also constitute an approximation of the multiple-channel SDR image 313 (as opposed to an exact reproduction of the multiple-channel SDR image 313, which can otherwise be produced using the techniques described above in conjunction with FIGS. 2A-2E). In any case, data for the approximation curve 322 (e.g., any number of coordinates for effectively regenerating the approximation curve 322, any formula for regenerating the approximation curve 322, etc.) can be stored with the multiple-channel HDR image 311 (e.g., as metadata that accompanies the multiple-channel HDR image 311). In this manner, the multiple-channel HDR image 311 can be semi-accurately downgraded to an SDR equivalent, which can be beneficial when the performance/efficiency outweighs the importance of accuracy.

Figure 3C:
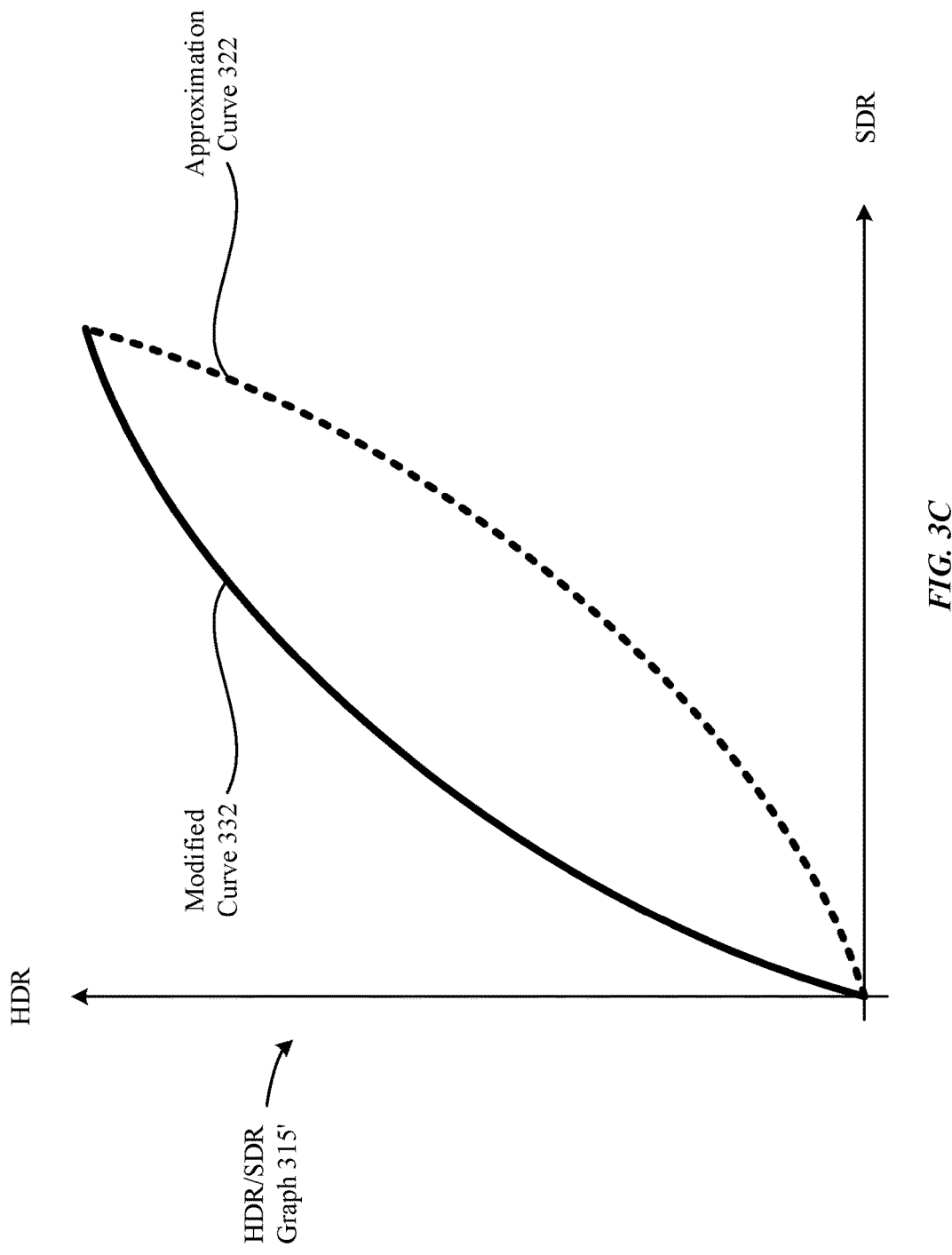
Figure 3D:
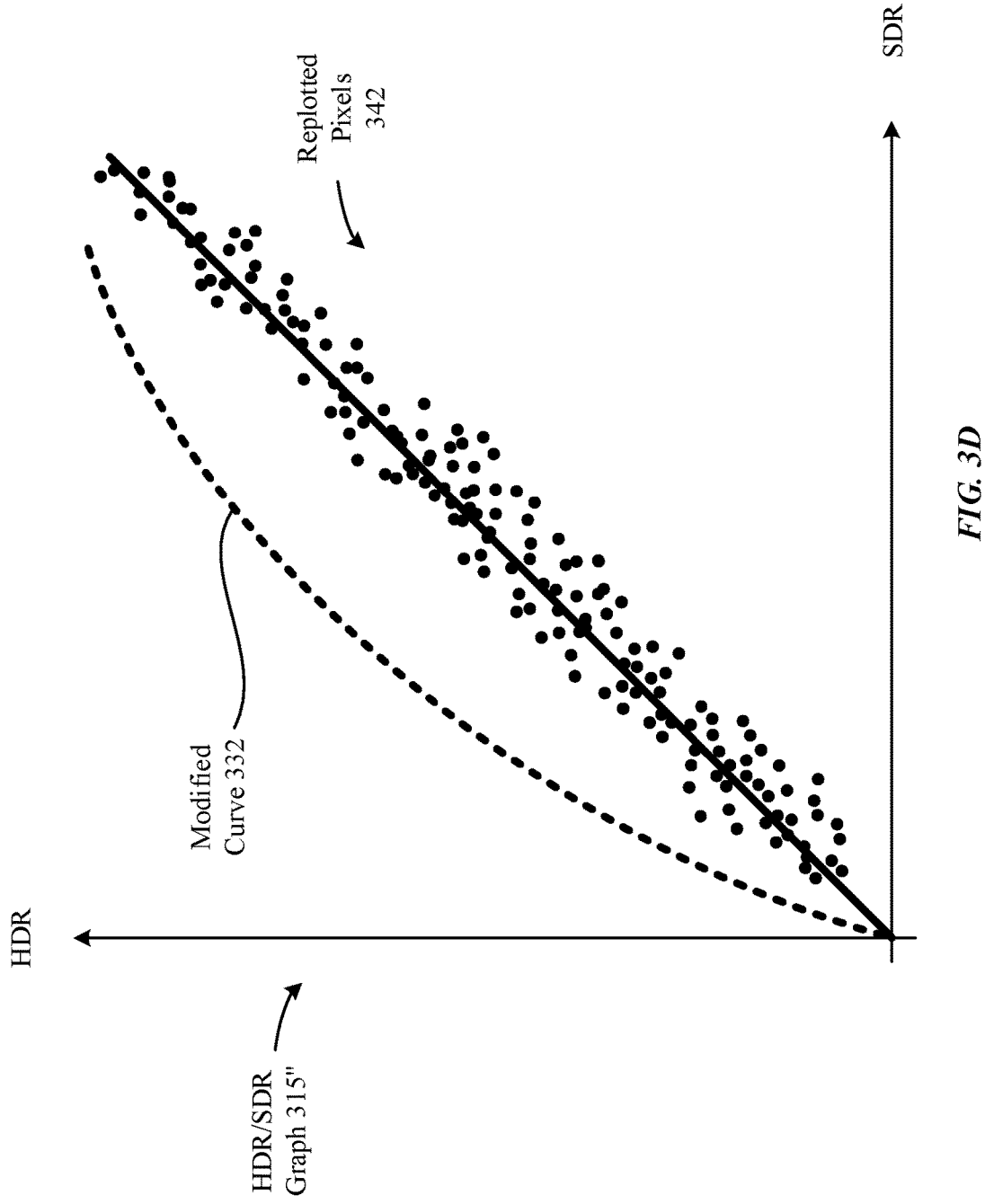

FIG. 3C illustrates a step 330 that involves inverting the approximation curve 322 to establish a modified curve 332. The approximation curve 322 can be inverted using any approach for inverting an existing curve. For example, the approximation curve 322 can be replotted on reversed x and y axes of the HDR/SDR graph 315 to generate the modified curve 332. FIG. 3D illustrates a step 340 that involves applying the modified curve 332 against the plotted pixels 316 to establish replotted pixels 342. This can involve, for example, adjusting values of each of the plotted pixels 316 based on the corresponding area (i.e., values) in the modified curve 332. As shown in FIG. 3D, the replotted pixels 342 converge across the HDR/SDR graph 315 in a tighter formation relative to the plotted pixels 316. In this regard, a gain map that is generated based on the replotted pixels 342 would possess desirable properties relative to one generated based on the plotted pixels 316, such as decreased overall variances that improve the overall compressibility of the gain map.

Figure 3E:
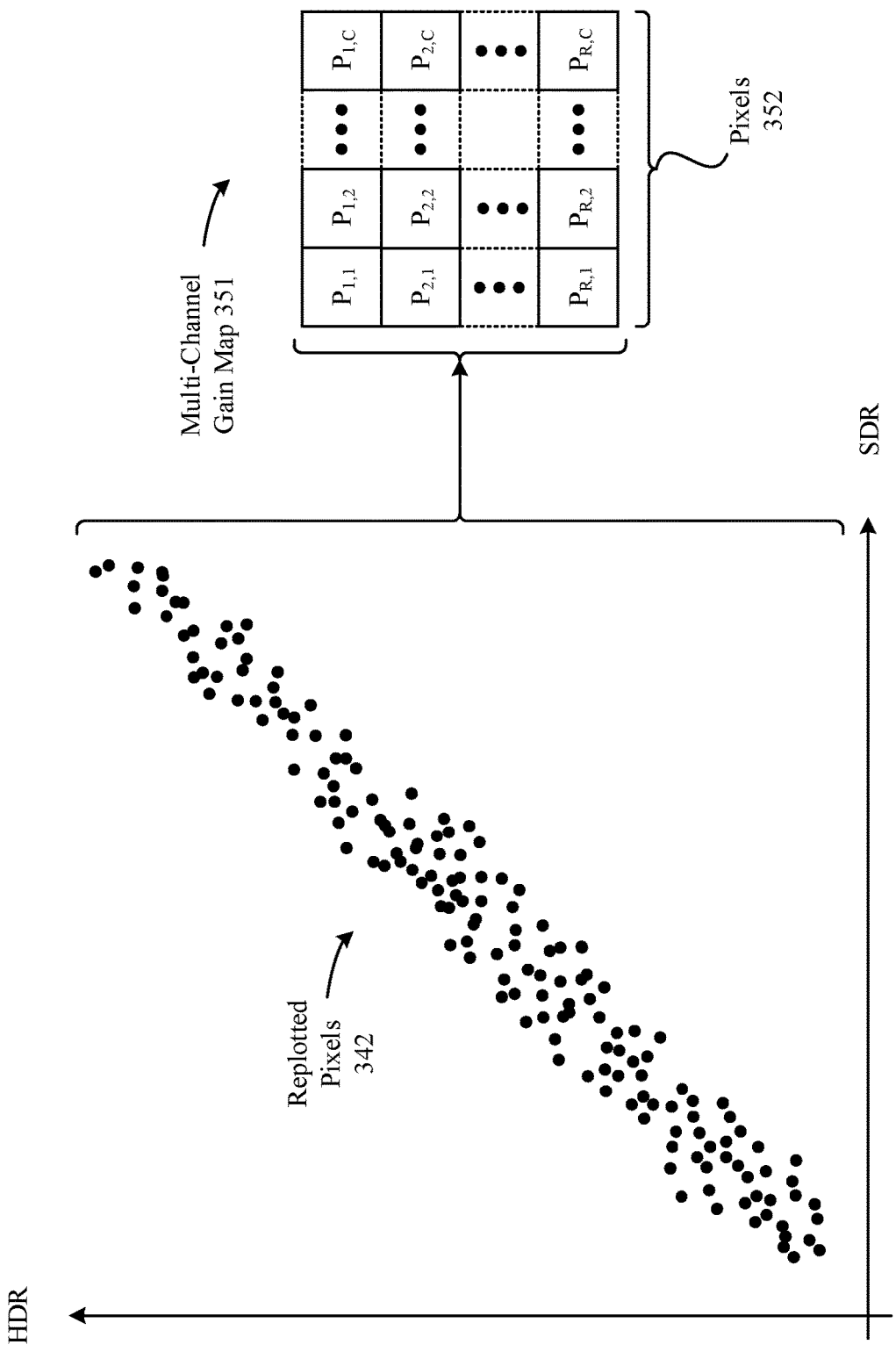
Figure 3F:
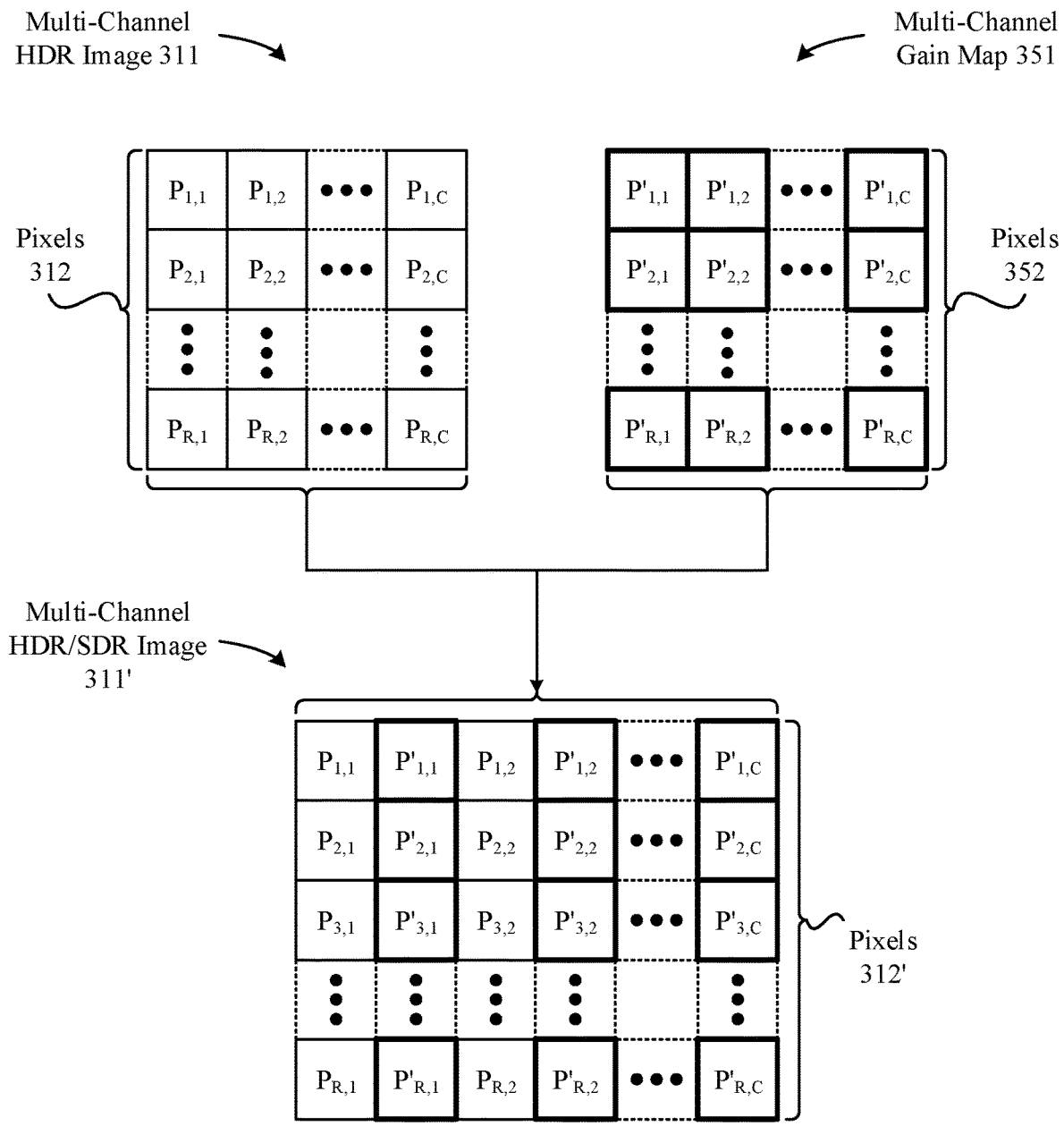

FIG. 3E illustrates a step 350 that involves generating multiple-channel gain map 351 based on the replotted pixels 342. According to some embodiments, generating the multiple-channel gain map 351 can involve, for each replotted pixel 342, comparing the y-axis HDR value of the replotted pixel 342 against the x-axis SDR value of the replotted pixel 342 to generate a quotient (e.g., using the comparison techniques described above in conjunction with FIG. 2C). In turn, the values of the quotients can be assigned into corresponding/respective pixels 352 of the multiple-channel gain map 351 (as illustrated in FIG. 3E). Additionally, FIG. 3F illustrates a step 360 that involves embedding the multiple-channel gain map 351 into the multiple-channel HDR image 311, thereby yielding an enhanced multiple-channel image 122. As shown in FIG. 3F, the step of embedding can be performed using any of the embedding techniques described above in conjunction with FIG. 2D.

Figure 3G:
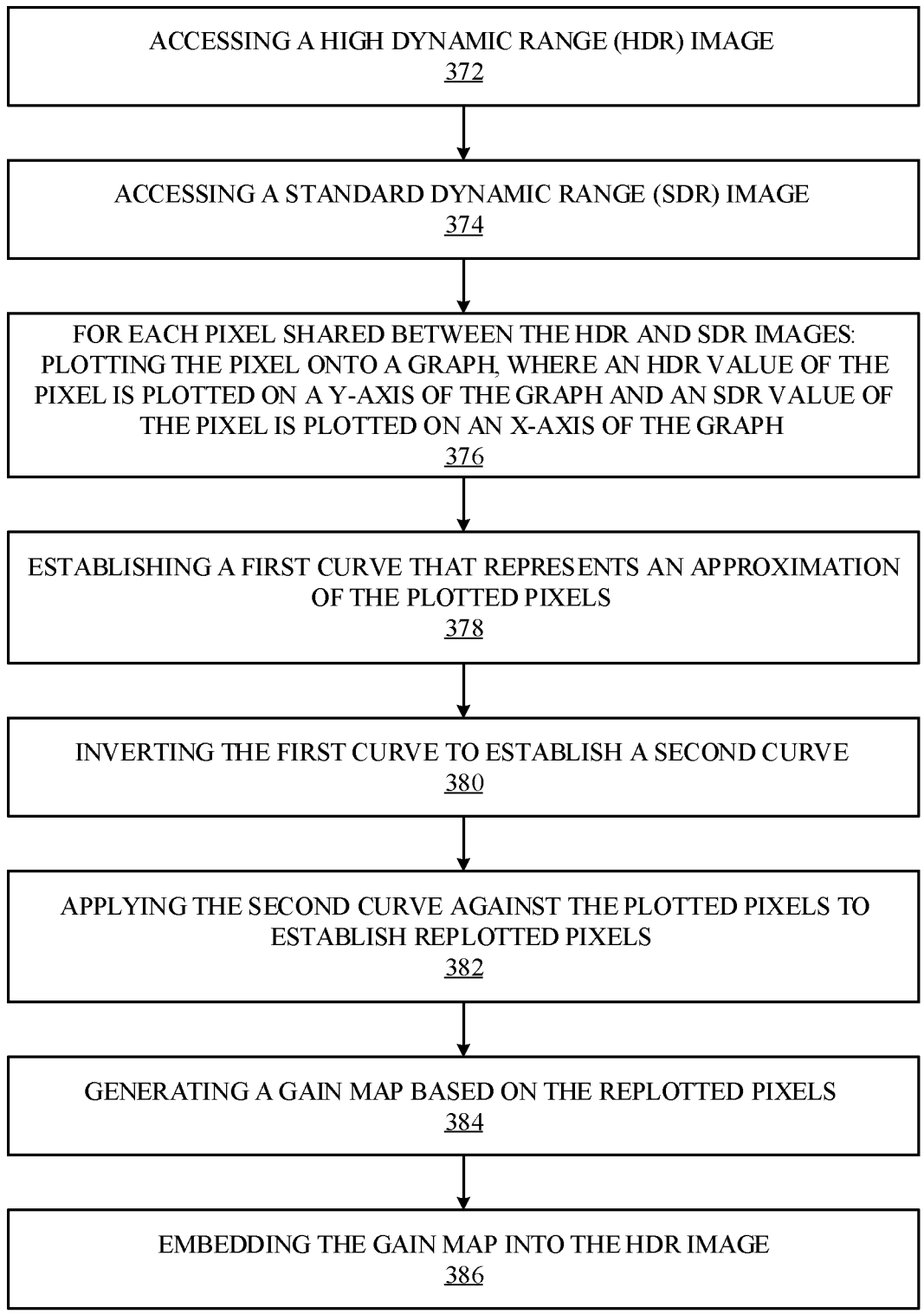

FIG. 3G illustrates a method 370 for an alternative technique for generating a gain map based on an SDR image and an HDR image, according to some embodiments. As shown in FIG. 3G, the method 370 begins at step 372, where the computing device 102 accesses an HDR image (e.g., as described above in conjunction with FIG. 3A). At step 374, the computing device 102 accesses an SDR image (e.g., as also described above in conjunction with FIG. 3A).

At step 376, the computing device 102 performs the following step for each pixel shared between the HDR and SDR images: plotting the pixel onto a graph, where an HDR value of the pixel is plotted on a y-axis of the graph and an SDR value of the pixel is plotted on an x-axis of the graph (e.g., as also described above in conjunction with FIG. 3A). At step 378, the computing device 102 establishes a first curve that represents an approximation of the plotted pixels (e.g., as described above in conjunction with FIG. 3B). At step 380, the computing device 102 inverts the first curve to establish a second curve (e.g., as described above in conjunction with FIG. 3C). At step 382, the computing device 102 applies the second curve against the plotted pixels to establish replotted pixels (e.g., as described above in conjunction with FIG. 3D).

At step 384, the computing device 102 generates a gain map based on the replotted pixels (e.g., as described above in conjunction with FIG. 3E). At step 386, the computing device 102 embeds the gain map into the HDR image (e.g., as described above in conjunction with FIG. 3F, thereby yielding an enhanced multiple-channel image 122).

Figure 4A:
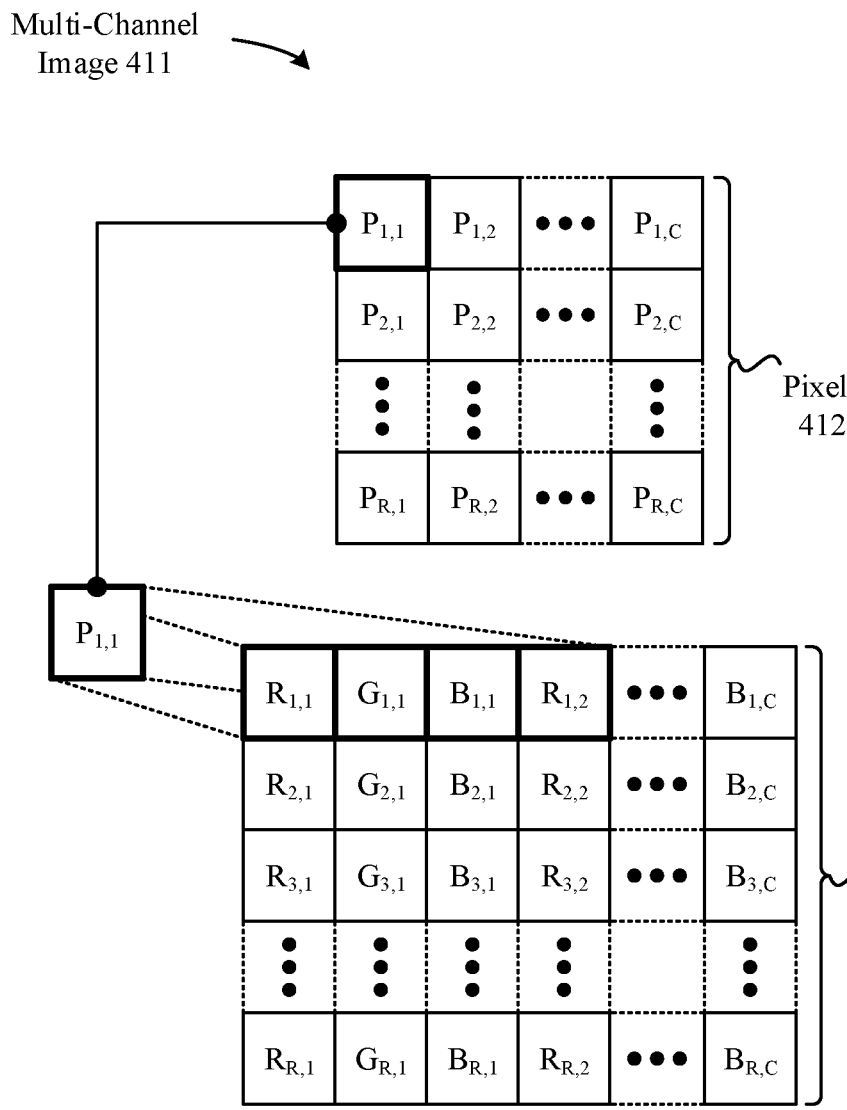
FIGS. 4A-4E illustrate a sequence of conceptual diagrams for an alternative technique for generating a gain map based on two different versions of the same image, according to some embodiments.

Additionally, FIGS. 4A-4E illustrate a sequence of conceptual diagrams for an alternative technique for generating a gain map based on two different versions of the same image, according to some embodiments. As shown in FIG. 4A, a step 410 involves the computing device 102 accessing a first version of a multiple-channel image 411 (e.g., in a manner similar to that described above in conjunction with FIG. 2A), where the multiple-channel image 411 includes pixels 412 and sub-pixels 414. The multiple-channel image 411 can represent, for example, an imported image (e.g., a scanned image, a computer-generated image, a received image, etc.).

Figure 4B:
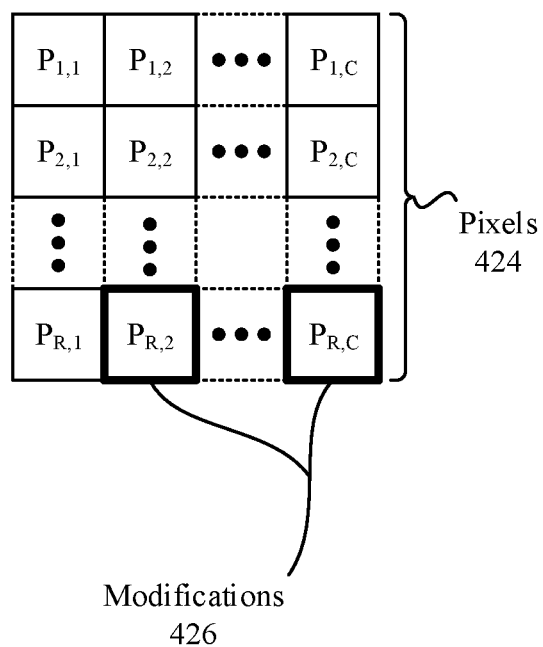

FIG. 4B illustrates a step 420 that involves the computing device 102 detecting at least one modification to the first version of the multiple-channel image 411 (illustrated as modifications 426) that produces a second version of the multiple-channel image (illustrated in FIG. 4B as the multiple-channel image 422). This can involve, for example, a markup being applied to the multiple-channel image 411, a filter being applied to the multiple-channel image 411, a photographic style being applied to the multiple-channel image 411, a destination display device profile being applied to the multiple-channel image 411, a color correction profile being applied to the multiple-channel image 411, and so on. It is noted that the foregoing examples are not meant to be limiting, and that the modifications 426 can represent any conceivable change that can be made to the multiple-channel image 411 without departing from the scope of this disclosure. In any case, and as shown in FIG. 4B, the modifications 426 involve changes to the pixels denoted "$P_{R,2}$" through "$P_{R,C}$".

Figure 4C:
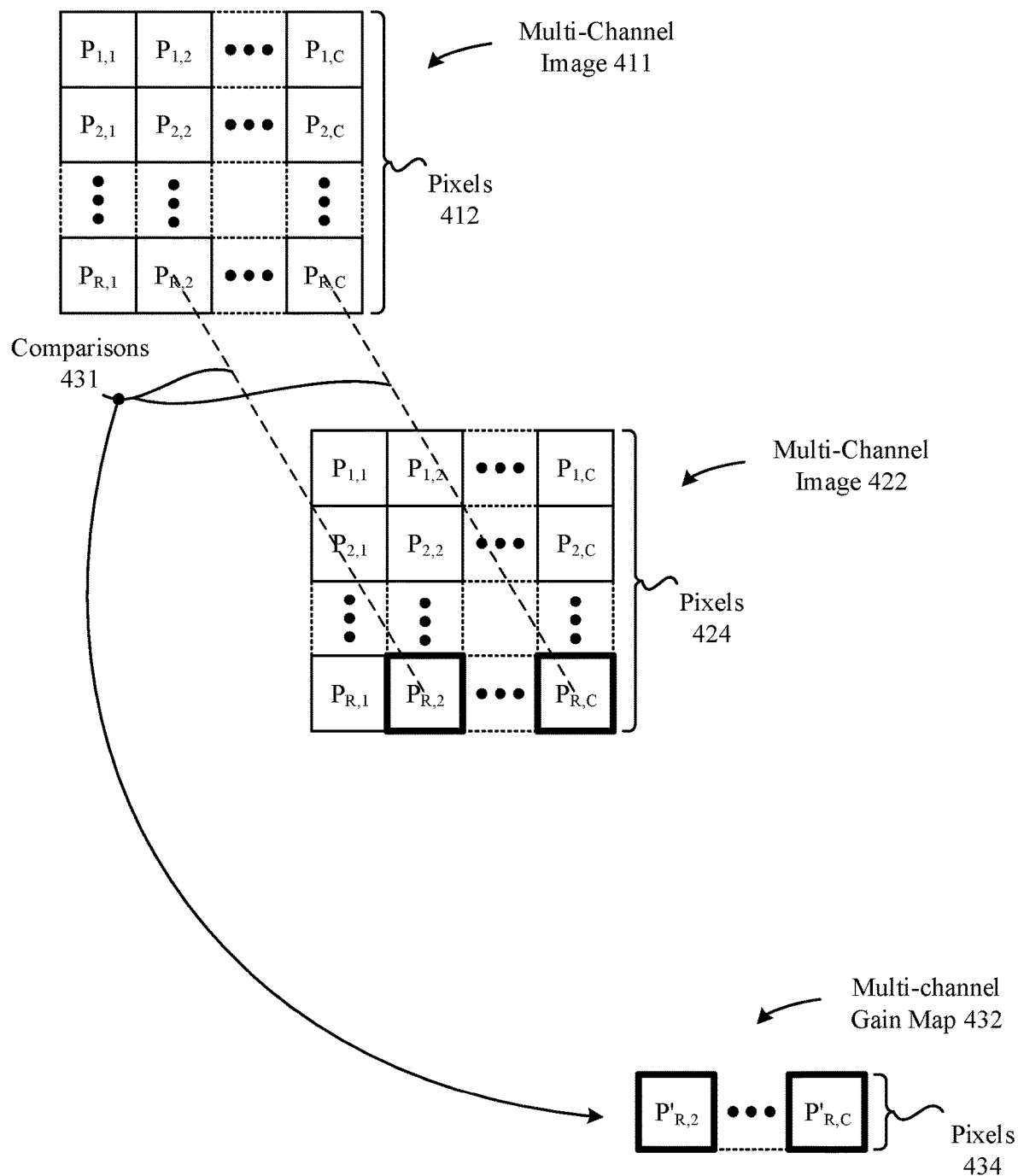

FIG. 4C illustrates a step 430 that involves the computing device 102 generating a multiple-channel gain map 432 by comparing the multiple-channel image 411 (i.e., the first version of the image) to the multiple-channel image 422 (i.e., the second version of the image). Here, the comparisons can be performed using any of the techniques described herein, such as those described above in conjunction with FIG. 2C. Additionally, and as shown in FIG. 4C, the comparison can be optimized by narrowing the comparisons only to the pixels 424 of the multiple-channel image 422 that have changed relative to the pixels 412 of the multiple-channel image 411. This optimization is beneficial in that the pixels 412 that are unmodified relative to the pixels 424 can be disregarded. This provides the benefit of saving on comparison operations that can be resource intensive as well as reducing the size (i.e., storage requirements) of the multiple-channel gain map 432.

Accordingly, and as shown in FIG. 4C, the multiple-channel gain map 432 can be constrained to include only pixels 434 that store the differences between the pixels 424 of the multiple-channel image 422 that have actually changed relative to the pixels 412 of the multiple-channel image 411. In this regard, the overall size of/storage space requirements for the multiple-channel gain map 432 are substantially reduced. However, due to the omission of pixels 434 that otherwise correspond to the pixels 424 and 412, coordinate information for the pixels 434 would be retained as needed in order to effectively embed the multiple-channel image 411 with the requisite information to reproduce the multiple-channel image 411 using the multiple-channel gain map 432.

Figure 4D:
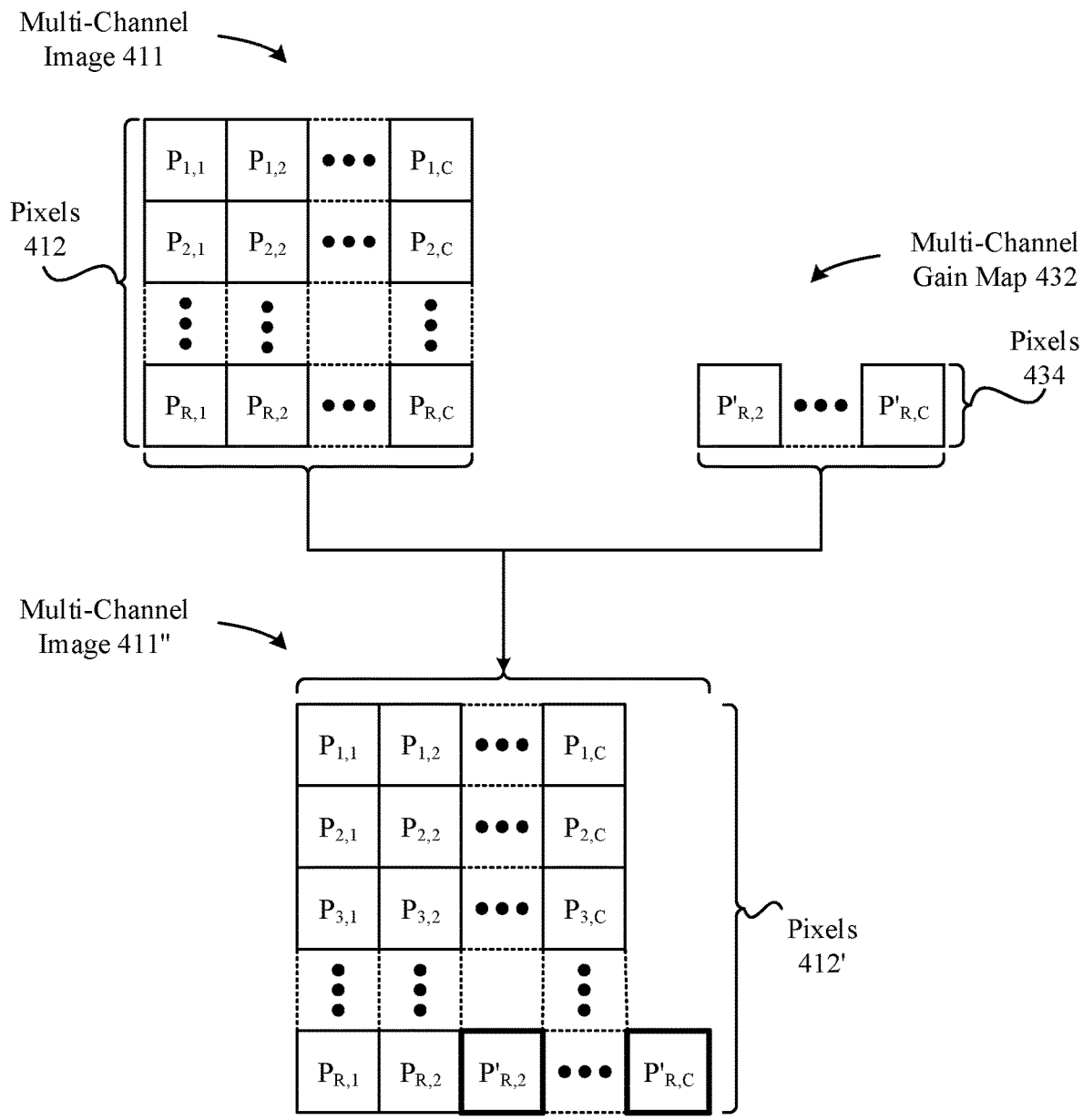

FIG. 4D illustrates a step 440 that involves the computing device 102 embedding the multiple-channel gain map 432 into the multiple-channel image 411. This can involve, for example, implementing any of the embedding techniques described above in conjunction with FIG. 2D to yield an enhanced multiple-channel image 122. However, unlike in FIG. 2D, there are fewer pixels 424 in the multiple-channel gain map 432 in comparison the number of pixels 412 in the multiple-channel image 411. In this regard, the multiple-channel gain map 432 can be stored as metadata, where each pixel 434 is supplemented with coordinate information that effectively maps each pixel 434 to the corresponding pixel 412 in the multiple-channel image 411. Alternatively, the value of each pixel 434 can be injected into its corresponding pixel 412 (e.g., as an adjacent pixel, as a supplemental channel to the corresponding pixel 412, etc.) such that the aforementioned coordinate information could be omitted. It is noted that the foregoing approaches are not meant to be limiting, and that any approach can be utilized to incorporate the multiple-channel gain map 432 into the multiple-channel image 411 in an optimal manner.

In any case, the foregoing approaches enable the multiple-channel image 411 and the multiple-channel gain map 432 to be utilized to generate the multiple-channel image 422 independent to the multiple-channel image 422 itself. This can provide a variety of benefits, such as an ability for a given user to undo the changes that occurred between the first version of the image and the second version of the image. Additionally, it is noted that additional gain maps can be generated as additional modifications are made to the multiple-channel image 411. When this occurs, temporal information about each gain map can also be incorporated into the multiple-channel image 411 to enable the different states of the multiple-channel image 411 to be progressively applied/reverted.

Figure 4E:
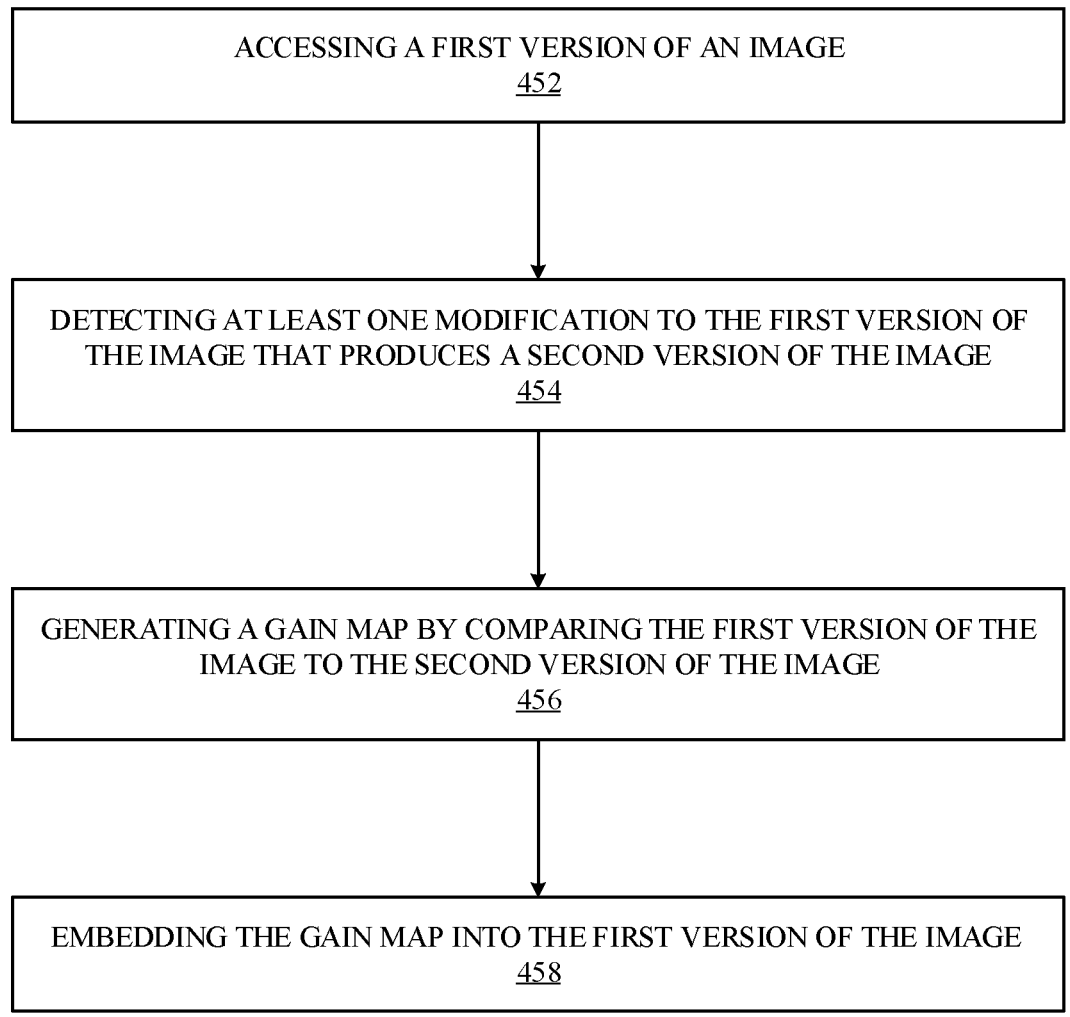

FIG. 4E illustrates a method 450 for an alternative technique for generating a gain map based on a first version of an image and a second version of an image, according to some embodiments. As shown in FIG. 4E, the method 450 begins at step 452, where the computing device 102 accesses a first version of an image (e.g., as described above in conjunction with FIG. 4A). At step 454, the computing device 102 detects at least one modification to the first version of the image that produces a second version of the image (e.g., as described above in conjunction with FIG. 4B). At step 456, the computing device 102 generates a gain map by comparing the first version of the image to the second version of the image (e.g., as described above in conjunction with FIG. 4C). At step 458, the computing device 102 embeds the gain map into the first version of the image (e.g., as described above in conjunction with FIG. 4D, thereby yielding an enhanced multiple-channel image 122).

FIG. 5 illustrates a detailed view of a computing device 500 that can be used to implement the various techniques described herein, according to some embodiments. In particular, the detailed view illustrates various components that can be included in the computing device 102 described in conjunction with FIG. 1. As shown in FIG. 5, the computing device 500 can include a processor 502 that represents a microprocessor or controller for controlling the overall operation of the computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, and so on. Still further, the computing device 500 can include a display 510 that can be controlled by the processor 502 (e.g., via a graphics component) to display information to the user. A data bus 516 can facilitate data transfer between at least a storage device 540, the processor 502, and a controller 513. The controller 513 can be used to interface with and control different equipment through an equipment control bus 514. The computing device 500 can also include a network/bus interface 511 that couples to a data link 512. In the case of a wireless connection, the network/bus interface 511 can include a wireless transceiver.

As noted above, the computing device 500 also includes the storage device 540, which can comprise a single disk or a collection of disks (e.g., hard drives). In some embodiments, storage device 540 can include flash memory, semiconductor (solid state) memory or the like. The computing device 500 can also include a Random-Access Memory (RAM) 520 and a Read-Only Memory (ROM) 522. The ROM 522 can store programs, utilities, or processes to be executed in a non-volatile manner. The RAM 520 can provide volatile data storage, and stores instructions related to the operation of applications executing on the computing device 500, e.g., the image analyzer 110/gain map generator 120.

The techniques described herein include a first technique for generating a gain map. According to some embodiments, the first technique can be implemented by a computing device, and includes the steps of: (1) accessing a high dynamic range (HDR) image; (2) accessing a standard dynamic range (SDR) image; (3) for each pixel shared between the HDR and SDR images: plotting the pixel onto a graph, wherein an HDR value of the pixel is plotted on a Y-axis of the graph and an SDR value of the pixel is plotted on an X-axis of the graph; (4) establishing a first curve that represents an approximation of the plotted pixels; (5) inverting the first curve to establish a second curve; (6) applying the second curve against the plotted pixels to establish replotted pixels; (7) generating the gain map based on the replotted pixels; and (8) embedding the gain map into the HDR image.

According to some embodiments, the first technique can further include the step of, subsequent to establishing the first curve: storing the first curve into the HDR image. According to some embodiments, the first curve is stored as metadata that accompanies the HDR image. According to some embodiments, the first curve comprises a global tone map for the HDR image.

According to some embodiments, the first technique can further include the steps of, prior to accessing the HDR image: (1) receiving at least a first exposure of a scene and a second exposure of the scene, wherein the first and second exposures are captured at a bit depth for storing HDR images; and (2) processing the first and second exposures to generate the HDR image.

According to some embodiments, the first technique can further include the steps of, prior to accessing the SDR image: (1) receiving at least a first exposure of a scene and a second exposure of the scene, wherein the first and second exposures are captured at a bit depth for storing SDR images; and (2) processing the first and second exposures to generate the SDR image.

The techniques described herein also include a second technique for generating a gain map. According to some embodiments, the second technique can be implemented by a computing device, and includes the steps of: (1) accessing a first version of an image; (2) detecting at least one modification to the first version of the image that produces a second version of the image; (3) generating the gain map by comparing the first version of the image to the second version of the image; and (4) embedding the gain map into the first version of the image.

According to some embodiments, the first version of the image comprises a high dynamic range (HDR) image or a standard dynamic range (SDR) image. According to some embodiments, the at least one modification is detected in conjunction with applying at least one photographic style to the first version of the image such that the second version of the image represents the first version of the image after the at least one photographic style is applied to the first version of the image. According to some embodiments, the at least one modification is detected in conjunction with applying a destination display device profile to the first version of the image such that the second version of the image represents the first version of the image after the destination display device profile is applied to the first version of the image. According to some embodiments, comparing the first version of the image against the second version of the image comprises, for each pixel of the second version of the image that is modified relative to the first version of the image: (i) identifying a corresponding pixel in the first version of the image, (ii) dividing the pixel by the corresponding pixel to generate a quotient, and (iii) storing the quotient as a corresponding pixel in the gain map.

According to some embodiments, embedding the gain map into the first version of the image comprises, for each pixel of the gain map: (i) identifying a corresponding pixel in the first version of the image, and (ii) storing values of the pixel as supplemental information in the corresponding pixel. According to some embodiments, embedding the gain map into the first version of the image comprises: storing the gain map as metadata that accompanies the first version of the image.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for generating a gain map, the method comprising, at a computing device:
   accessing a high dynamic range (HDR) image;
   accessing a standard dynamic range (SDR) image;
   for a plurality of pixels shared between the HDR and SDR images:
      plotting the plurality of pixels onto a graph, wherein an HDR value of a given pixel of the plurality of pixels is plotted on a Y-axis of the graph and an SDR value of the given pixel is plotted on an X-axis of the graph;
   establishing a first curve that represents an approximation of the plurality of pixels;
   inverting the first curve to establish a second curve;
   applying the second curve against the plurality of pixels to establish replotted pixels;
   generating the gain map based on the replotted pixels; and
   embedding the gain map into the HDR image.

2. The method of claim 1, wherein establishing the first curve that represent an approximation of the plurality of pixels includes determining a moving average of corresponding values of the plurality of pixels.

3. The method of claim 1, wherein inverting the first curve to establish the second curve includes replotting the first curve on reversed set of axes of the graph.

4. The method of claim 1, wherein applying the second curve against the plurality of pixels includes adjusting respective values of the plurality of pixels based on corresponding values in the second curve.

5. The method of claim 1, wherein generating the gain map includes comparing a Y-axis HDR value of a given replotted pixel to an X-axis SDR value of the given replotted pixel to generate a quotient.

6. The method of claim 5, further comprising assigning the quotient into a corresponding pixel of the gain map.

7. A non-transitory computer-readable storage medium configured to store instructions that, when executed by at least one processor included in a computing device, cause the computing device to generate a gain map, by carrying out steps that include:
   accessing a high dynamic range (HDR) image;
   accessing a standard dynamic range (SDR) image;
   for a plurality of pixels shared between the HDR and SDR images:
      plotting the plurality of pixels onto a graph, wherein an HDR value of a given pixel of the plurality of pixels is plotted on a Y-axis of the graph and an SDR value of the given pixel is plotted on an X-axis of the graph;

establishing a first curve that represents an approximation of the plurality of pixels;
inverting the first curve to establish a second curve;
applying the second curve against the plurality of pixels to establish replotted pixels;
generating the gain map based on the replotted pixels; and
embedding the gain map into the HDR image.

8. The non-transitory computer-readable storage medium of claim 7, wherein establishing the first curve that represent an approximation of the plurality of pixels includes determining a moving average of corresponding values of the plurality of pixels.

9. The non-transitory computer-readable storage medium of claim 7, wherein inverting the first curve to establish the second curve includes replotting the first curve on reversed set of axes of the graph.

10. The non-transitory computer-readable storage medium of claim 7, wherein applying the second curve against the plurality of pixels includes adjusting respective values of the plurality of pixels based on corresponding values in the second curve.

11. The non-transitory computer-readable storage medium of claim 7, wherein generating the gain map includes comparing a Y-axis HDR value of a given replotted pixel to an X-axis SDR value of the given replotted pixel to generate a quotient.

12. The non-transitory computer-readable storage medium of claim 11, further comprising assigning the quotient into a corresponding pixel of the gain map.

13. The non-transitory computer-readable storage medium of claim 7, wherein embedding the gain map into the HDR image includes embedding a particular pixel of the gain map into a corresponding pixel of the HDR image as an additional channel of the corresponding pixel.

14. A computing device configured to generate a gain map, the computing device comprising:
at least one processor; and
at least one memory storing instructions that, when executed by the at least one processor, cause the computing device to carry out steps that include:
accessing a high dynamic range (HDR) image;
accessing a standard dynamic range (SDR) image;
for a plurality of pixels shared between the HDR and SDR images:
plotting the plurality of pixels onto a graph, wherein an HDR value of a given pixel is plotted on a Y-axis of the graph and an SDR value of the given pixel is plotted on an X-axis of the graph;
establishing a first curve that represents an approximation of the plurality of pixels;
inverting the first curve to establish a second curve;
applying the second curve against the plurality of pixels to establish replotted pixels;
generating the gain map based on the replotted pixels; and
embedding the gain map into the HDR image.

15. The computing device of claim 14, wherein establishing the first curve that represent an approximation of the plurality of pixels includes determining a moving average of corresponding values of the plurality of pixels.

16. The computing device of claim 14, wherein inverting the first curve to establish the second curve includes replotting the first curve on reversed set of axes of the graph.

17. The computing device of claim 14, wherein applying the second curve against the plurality of pixels includes adjusting respective values of the plurality of pixels based on corresponding values in the second curve.

18. The computing device of claim 14, wherein generating the gain map includes comparing a Y-axis HDR value of a given replotted pixel to an X-axis SDR value of the given replotted pixel to generate a quotient.

19. The computing device of claim 18, further comprising assigning the quotient into a corresponding pixel of the gain map.

20. The computing device of claim 14, wherein embedding the gain map into the HDR image includes embedding a particular pixel of the gain map into a corresponding pixel of the HDR image as an additional channel of the corresponding pixel.

* * * * *